US010063660B1

(12) United States Patent
Coldham et al.

(10) Patent No.: US 10,063,660 B1
(45) Date of Patent: Aug. 28, 2018

(54) COLLABORATIVE EDITING OF MEDIA IN A MIXED COMPUTING ENVIRONMENT

(71) Applicant: PicMonkey, LLC, Seattle, WA (US)

(72) Inventors: Andrew Coldham, Seattle, WA (US); Benjamin VandenBos, Bend, OR (US); Peter Grant, Louisville, KY (US)

(73) Assignee: PicMonkey, LLC, Seattle, WA (US)

( * ) Notice: Subject to any disclaimer, the term of this patent is extended or adjusted under 35 U.S.C. 154(b) by 0 days.

(21) Appl. No.: 15/893,233

(22) Filed: Feb. 9, 2018

(51) Int. Cl.
| | |
|---|---|
| *G06Q 10/10* | (2012.01) |
| *H04L 29/06* | (2006.01) |
| *G06F 17/30* | (2006.01) |
| *G06F 17/24* | (2006.01) |
| G06F 3/0484 | (2013.01) |
| H04L 29/08 | (2006.01) |

(52) U.S. Cl.
CPC .............. *H04L 67/38* (2013.01); *G06F 17/24* (2013.01); *G06F 17/30174* (2013.01); *G06F 3/04842* (2013.01); *G06Q 10/103* (2013.01); *H04L 67/02* (2013.01)

(58) Field of Classification Search
CPC ......... H04L 67/38; H04L 67/02; G06F 17/24; G06F 17/30174; G06F 3/04842
See application file for complete search history.

(56) References Cited

U.S. PATENT DOCUMENTS

| | | | |
|---|---|---|---|
| 6,452,615 B1 | 9/2002 | Chiu et al. | |
| 7,594,163 B2* | 9/2009 | Slack-Smith | ....... G06F 17/2288 715/200 |
| 9,552,842 B2* | 1/2017 | Parente | ............ H04N 21/47205 |
| 9,583,140 B1* | 2/2017 | Rady | ..................... G11B 27/031 |
| 9,959,851 B1* | 5/2018 | Fernandez | ........... G10H 1/0066 |
| 2005/0216549 A1 | 9/2005 | Amano et al. | |
| 2007/0022159 A1* | 1/2007 | Zhu | ..................... H04L 12/1831 709/204 |
| 2007/0094328 A1 | 4/2007 | Birch | |
| 2011/0026898 A1* | 2/2011 | Lussier | ................ G11B 27/034 386/280 |
| 2013/0232498 A1* | 9/2013 | Mangtani | .............. G06F 9/5072 718/104 |

(Continued)

OTHER PUBLICATIONS

"Metadata: Hybrid Logical Clocks," MURAT, Jul. 27, 2014, <http://muratbuffalo.blogspot.com/2014/07/hybrid-logical-clocks.html> [retrieved Jan. 10, 2018], 5 pages.

(Continued)

*Primary Examiner* — Alina A Boutah
(74) *Attorney, Agent, or Firm* — Davis Wright Tremaine LLP

(57) ABSTRACT

A user computing device may receive a command from a user to modify an object of a canvas. The canvas state may be shared between multiple users as part of a collaborative editing session. The received command may be accepted and the user computing device may perform a first operation on the object of the canvas according to the command, such as modifying a mutable attribute. The computing device may perform one or more steps to generate a patch. The computing device may be configured to receive a remote patch and process the remote patch in a manner where some operations of the remote patch are discarded and other operations of the remote patch are applied. A hybrid logical clock may be utilized to coordinate the application of remote patches.

17 Claims, 14 Drawing Sheets

(56) References Cited

U.S. PATENT DOCUMENTS

| | | | |
|---|---|---|---|
| 2013/0275312 A1* | 10/2013 | Claman | G06Q 10/103 705/301 |
| 2014/0023291 A1* | 1/2014 | Lin | G06T 5/003 382/279 |
| 2014/0055400 A1 | 2/2014 | Reuschel | |
| 2014/0176750 A1* | 6/2014 | Pajak | H04N 5/225 348/222.1 |
| 2014/0222916 A1* | 8/2014 | Foley | G06Q 10/101 709/204 |
| 2015/0278986 A1* | 10/2015 | Edwin | G06T 3/0012 345/428 |
| 2015/0287434 A1 | 10/2015 | Hall et al. | |
| 2016/0034111 A1* | 2/2016 | Sahai | G06Q 10/10 715/730 |
| 2016/0133294 A1* | 5/2016 | Dyer-Smith | G11B 27/031 386/241 |
| 2016/0253512 A1* | 9/2016 | Evers | G06F 21/6218 726/6 |
| 2017/0181113 A1 | 6/2017 | Keyser-Allen et al. | |
| 2017/0214726 A1* | 7/2017 | Malatesha | G06F 3/04817 |
| 2017/0220546 A1 | 8/2017 | Codrington et al. | |
| 2017/0285916 A1* | 10/2017 | Xu | G06F 3/04845 |
| 2017/0346851 A1* | 11/2017 | Drake | H04L 63/1466 |
| 2018/0011627 A1 | 1/2018 | Siracusano, Jr. | |

OTHER PUBLICATIONS

Kulkarni et al., "Logical Physical Clocks and Consistent Snapshots in Globally Distributed Databases," Michigan State University, University at Buffalo, SUNY, Apr. 2014, 13 pages.

* cited by examiner

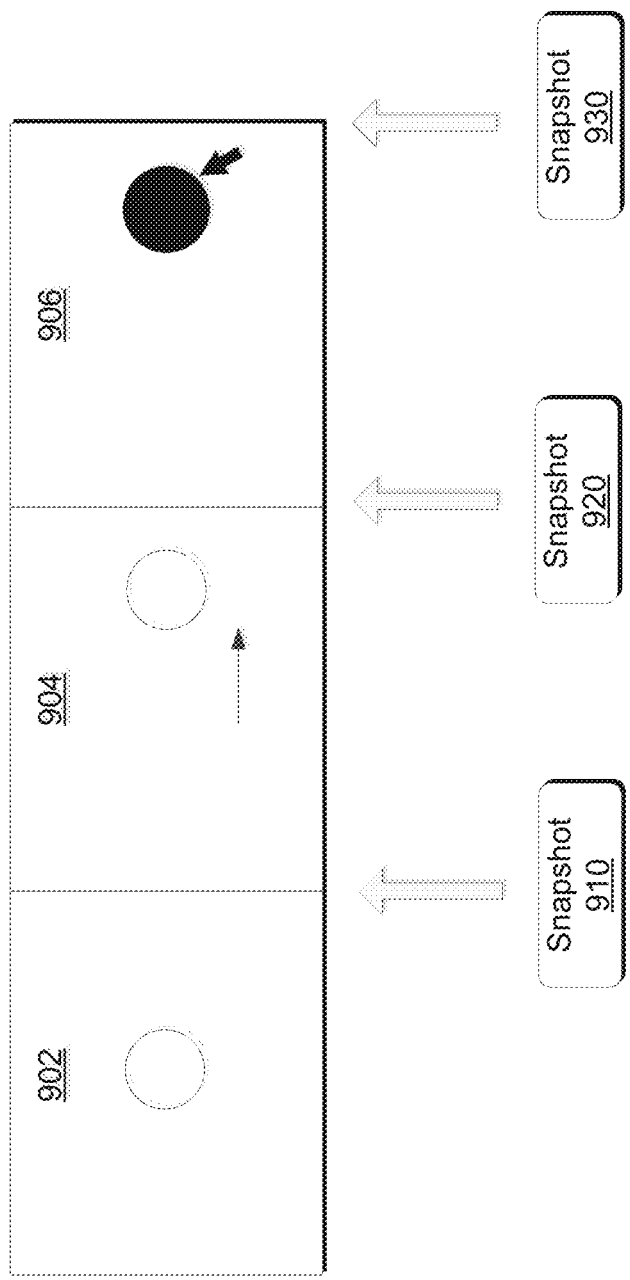

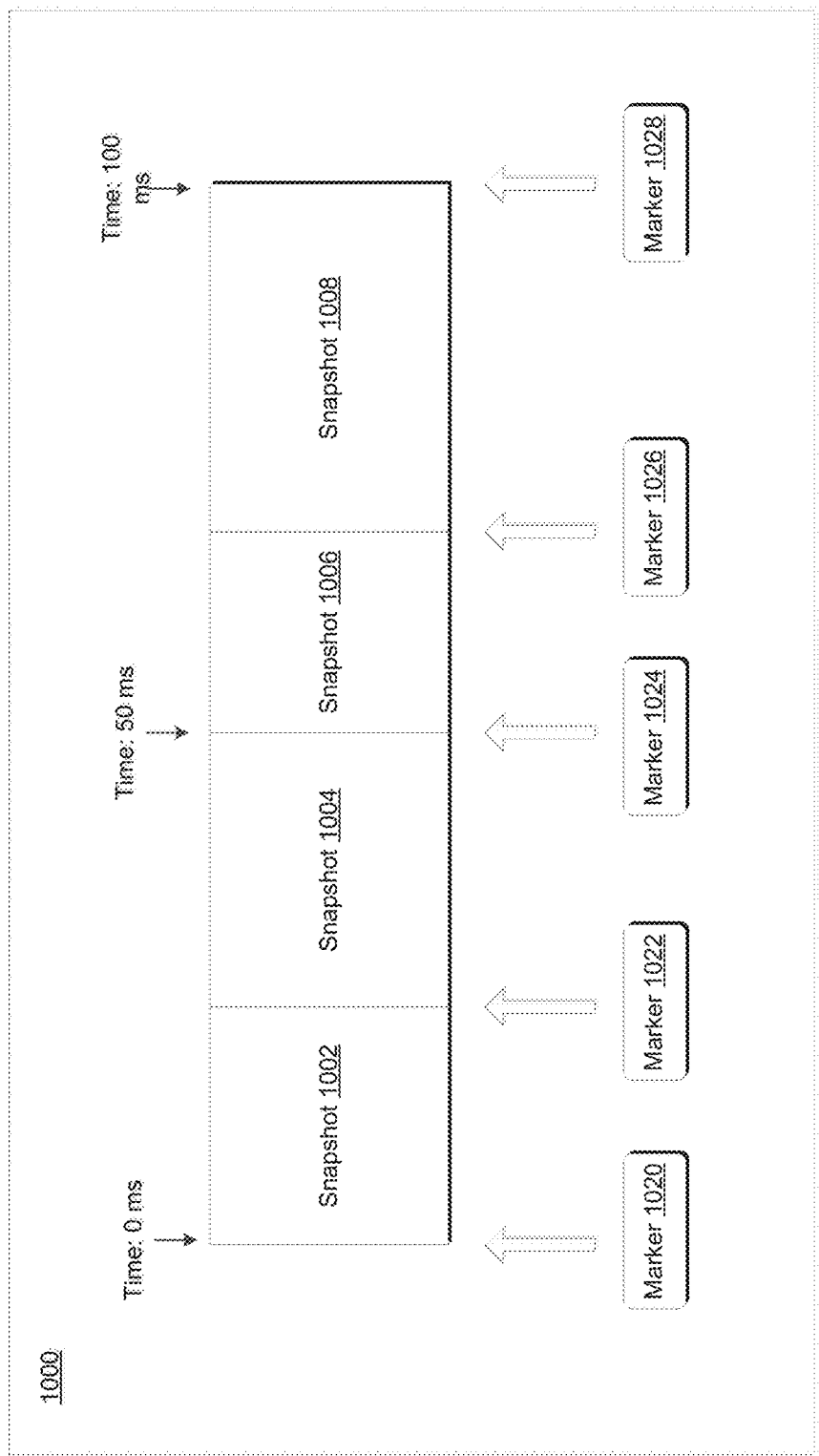

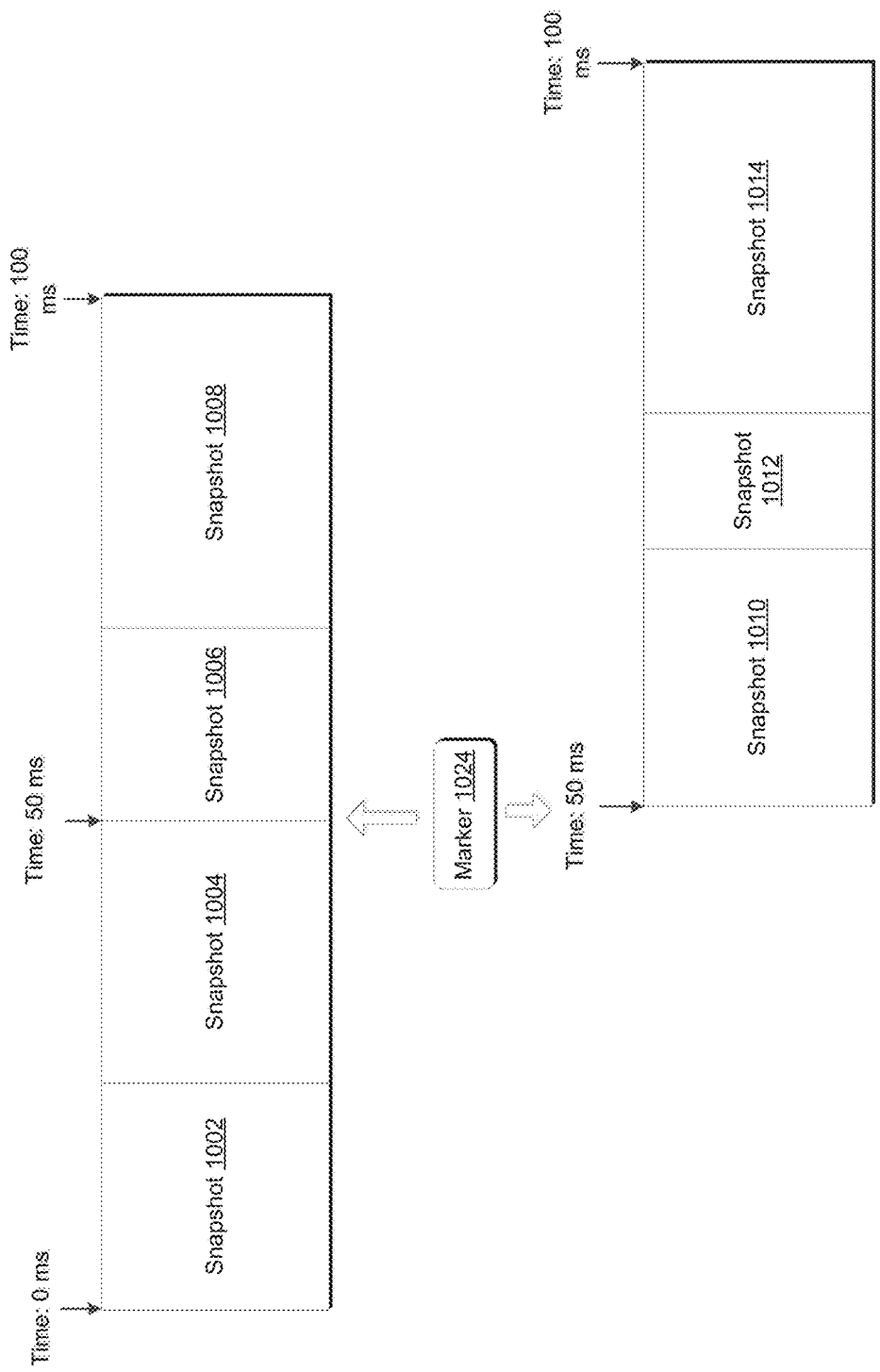

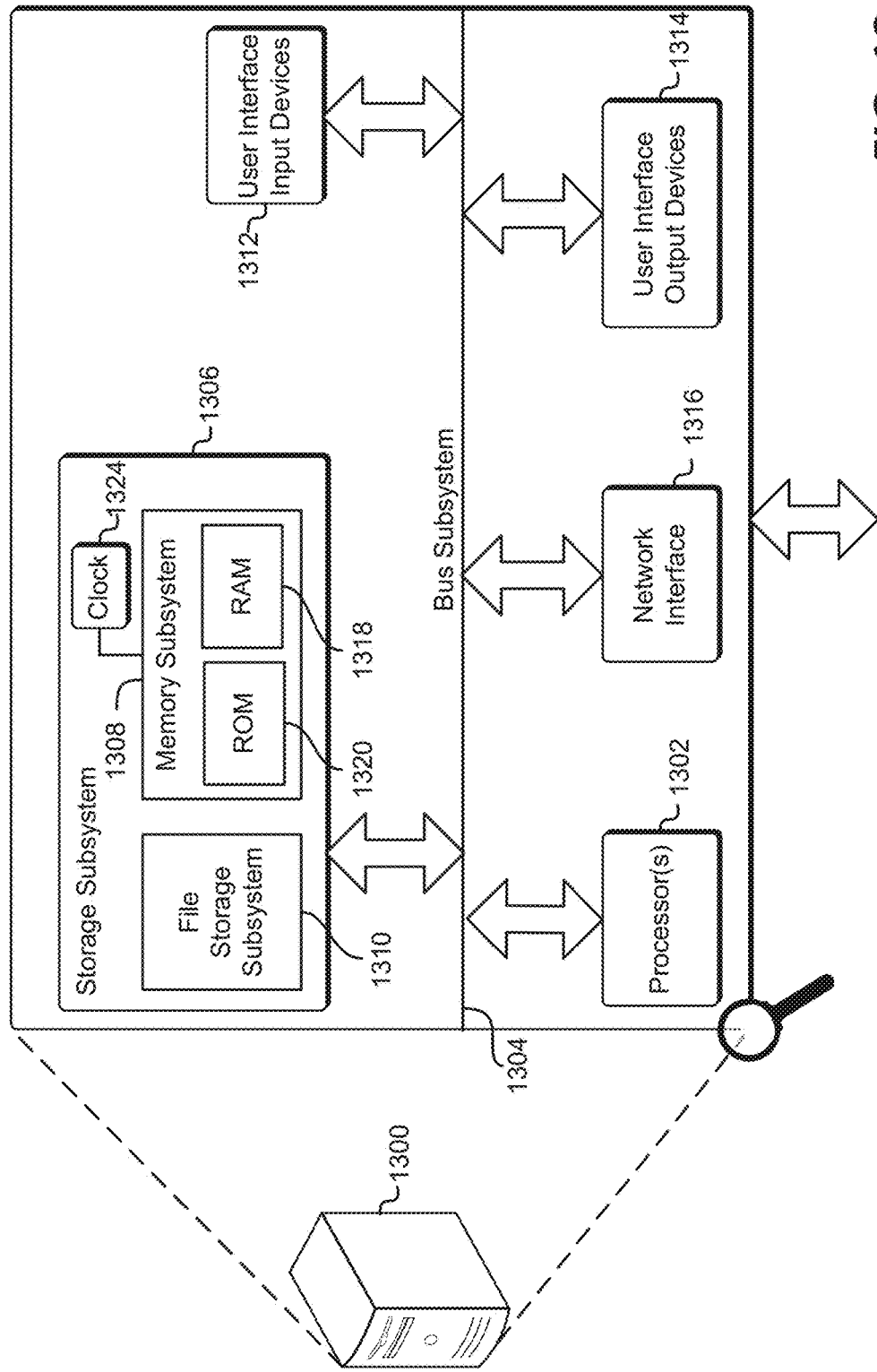

COLLABORATIVE EDITING OF MEDIA IN A MIXED COMPUTING ENVIRONMENT

CROSS-REFERENCE TO RELATED APPLICATIONS

This application is related to and incorporates by reference for all purposes the full disclosure of co-pending U.S. patent application Ser. No. 15/893,192, filed concurrently herewith, entitled "LIVE-RENDERED AND FORKABLE GRAPHIC EDIT TRAILS".

BACKGROUND

Collaborative editing of media assets such as photos, images, canvases, graphics, and video in a multi-user and mixed computing environment involves many technical challenges. In many cases, it is desirable to allow multiple, heterogeneous graphics devices to edit media assets and view changes to media assets made by other participating devices. However, rendering editing actions of multiple media assets by multiple users in real-time (e.g., near real-time) is challenging. Latency and bandwidth limitations may constrain the amount of data a user is able to upload in real-time, making it impractical for a user to repeatedly upload the entire local state of the user. Furthermore, it is difficult to achieve tight clock synchronization in a multi-user environment, high-frequency environment while also providing assurance of consistency between the multiple users, especially when the multiple users are located in geographically diverse locales that may introduce additional network congestion and/or latency.

BRIEF DESCRIPTION OF THE DRAWINGS

Various techniques will be described with reference to the drawings, in which:

FIG. 9 illustrates a diagram of generating snapshots to include one or more patches that are based on changes to a state of an object associated with a canvas as one or more operations are being performed on the object;

FIG. 10 illustrates a diagram of assigning a plurality of markers associated with the one or more snapshots;

FIG. 11A illustrates a diagram of a locating a marker and performing one or more operations on an object associated with a canvas to generate one or more additional patches that are captured by additional snapshots;

FIG. 13 illustrates a computing environment in which various embodiments can be implemented.

DETAILED DESCRIPTION

Figure 1:
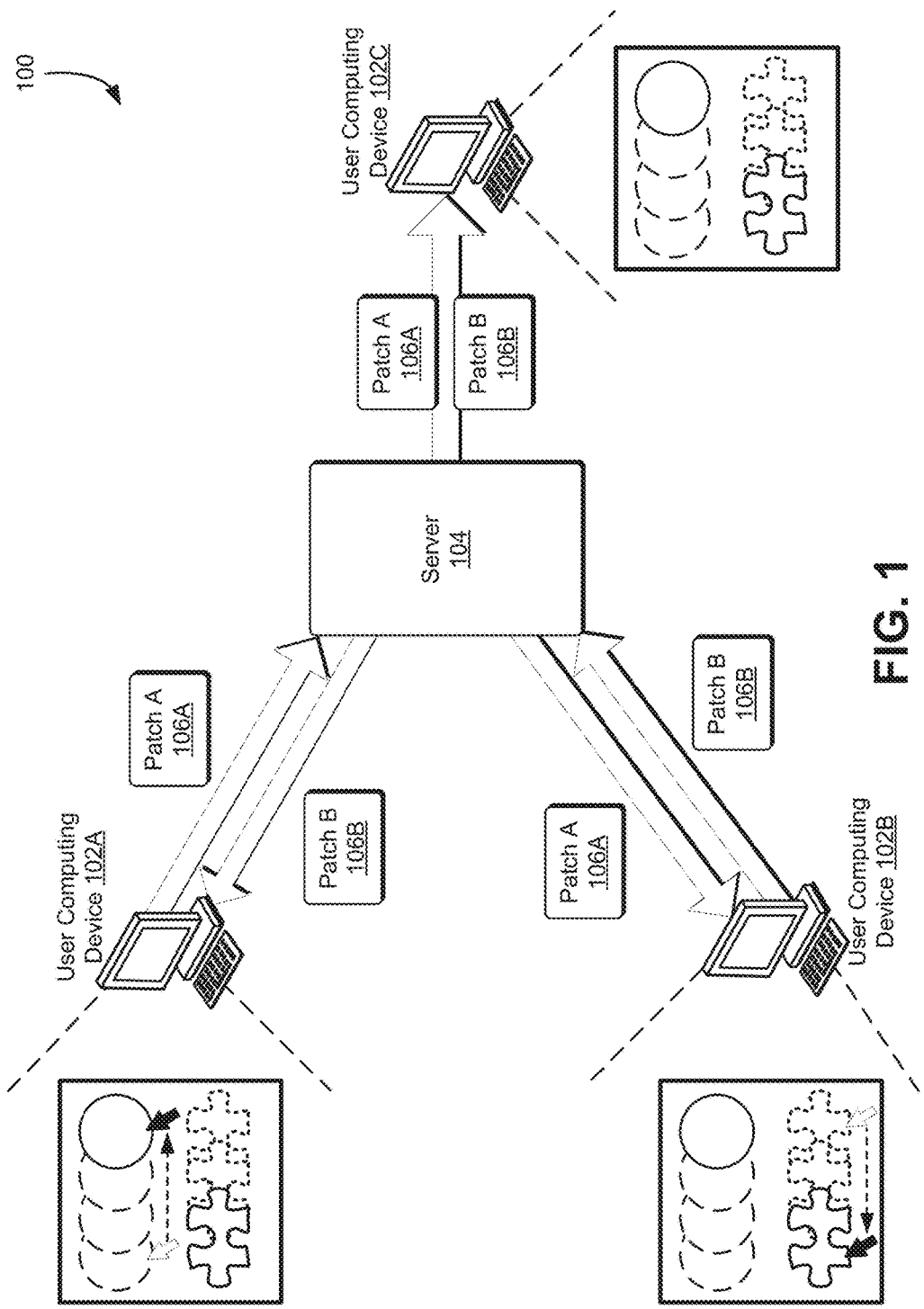
FIG. 1 illustrates an environment in which one embodiment may be practiced.

Systems and methods described herein may be used to support collaborative editing of media assets in a multi-user computing environment. A multi-user computing environment may comprise a central server (e.g., a service of a computing resource service provider) and one or more users that have access to (e.g., via a computing device) a local canvas that encapsulates a local view of a shared state. For example, multiple users of a collaborative editing session may have a shared view on a canvas that includes multiple objects, attributes, and properties, which may be rendered as vector and/or rasterized graphics. In some cases, the multiple users will have the same view with respect to a local canvas. When a particular user of the collaborative editing session makes a change to the canvas, that change may be propagated, via the server, to the other users of the collaborative editing session so that the canvas shown to other users are updated with some or all of the changes made by the particular user.

Specifically, when a user entity issues a command to a local computing device hosting a local canvas, the command may be processed and an object of the canvas is modified. The object may be modified, for example, by updating the value of a mutable attribute associated with the object, such as the coordinates of an image asset on a canvas, the transparency value of a layer, and so on. In addition, a timestamp may be recorded that indicates when the command was processed at the local canvas. The timestamp, in an embodiment, is based on a value generated using a hybrid logical clock (HLC) such as a HLC timestamp. Additionally, a patch that encodes information related to these changes may be transmitted to a server, and the server may receive the patch and perform various operations such as propagating the patch to other user computing devices, storing the patch in a data storage service, generating the state of a snapshot, compacting one or more operations of the patch, and more.

A user computing device of a collaborative editing session may receive a patch from another user computing device of the same session that encodes one or more changes made by that respective user computing device. The user computing device may process the patch and determine whether to apply the remote operations. In many cases, blindly applying all changes may lead to a loss of integrity and/or consistency. Instead, the user computing device may determine an operational ordering wherein each user computing device supports conflict-free replicated data types (CRDT) around collectively deciding on the ordering of events. For example, a last-writer-wins conflict resolution protocol may be utilized. The user computing devices of the collaborative editing system may utilize HLCs in determining the operational ordering, wherein the HLCs are used to determine at least a partial ordering between local operations applied by the user computing device and remote operations received in patches.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which an embodiment may be practiced. The environment 100 may be used to implement a system that supports collaborative editing of graphics in a multi-user computing environment. FIG. 1 illustrates an example environment 100 where a first user associated with a first user computing device 102A applies a first change to a shared canvas (e.g., moves a circle from the upper-left region of the canvas to the upper-right region of the canvas) and a second user associated with a second user computing device 102B simultaneously applies a second change to the shared canvas (e.g., moves a puzzle piece image asset from the lower-right region of the canvas to the lower-left region of the canvas), wherein the changes are encoded as patches 106A and 106B that are distributed to other users associated with other devices (e.g., a third user associated with a third user computing device 102C) of the collaborative editing session, thereby allowing other users to see the changes being made to the canvas in real-time or nearly real-time conditions. The user computing devices, server, and patches illustrated in FIG. 1 may be in accordance with those described elsewhere in this disclosure, such as those described in connection with FIGS. 2, 3, and 5.

Collaborative editing may refer to multiple user computing devices having the ability to view and/or contribute to a shared canvas. Each user computing device of a collaborative editing session may have a local canvas to which local and remote changes are applied. For example, FIG. 1 illustrates an environment 100 in which three user computing devices 102A, 102B, and 102C collaboratively contribute to an image editing project. For clarity, the shared canvas illustrated in FIG. 1 includes two objects—a circle and a puzzle piece—and it should be noted that a canvas may have additional objects. An object may refer to rasterized images (e.g., a graphics interchangeable format (GIF) image) and vector graphics (e.g., a box, circle, and other shapes), layers, and, generally speaking, any mutable aspect of a canvas. Non-exhaustive examples of raster file formats include: graphics interchangeable format (GIF), Joint Photographic Experts Group (JPEG), Portable Network Graphics (PNG), Exchangeable image file format (EXIF), and Tagged Image File Format (TIFF). Non-exhaustive examples of vector file formats include: Scalable Vector Graphics (SVG), Computer Graphics Metafile (CGM), and Gerber format (RS-274X). In an embodiment, each object has a set of mutable attributes associated with the object, such as the object's location (e.g., encoded as an x-coordinate and y-coordinate), size, orientation, fade, color, and more. Moreover, objects and attributes of objects may include objects and attributes that are known to one of skill in the art.

The environment 100 illustrates user computing devices 102A, 102B, and 102C of a collaborative editing session. In an embodiment, a user controls a user computing device (e.g., a user computing device illustrated in FIG. 1 or another user computing device not shown in FIG. 1) creates a shared canvas by submitting a request to the server 104 to create a shared canvas. The shared canvas may be assigned a session identifier that is usable for other user computing devices to connect to an ongoing session, reconnect to an ongoing session, resume a session, and otherwise interact with the shared canvas. A canvas may have an initial state, such as blank canvas with one layer, or may have a set of initial objects and attributes according to a template that is selected by the user creating the session. In any case, the creation of the session may be recorded by the server 104, which may have access to one or more data storage devices (e.g., a hard disk drive), a data storage service, or any other suitable system for storing data related to the creation of a session, including virtualizations thereof. In an embodiment, the server 104 responds to the user request by providing an indication that the canvas was created and initializing an editing session. In an embodiment, the user can also indicate to one or more other users to join a collaborative editing session, and the server transmits a notification to the one or more users with an invitation to join the collaborative editing session, such as an email message with a web link usable to connect to the session.

In an embodiment, user computing devices 102A, 102B, and 102C are illustrative examples of computing devices of a collaborative editing session. Users may alternatively refer to the entities controlling the respective computing devices or the computing devices that the users interact with. A user may be an entity (e.g., an individual) that interacts with software running on a computing device in any suitable manner, such as those described elsewhere in this disclosure, such as those described in connection with FIGS. 3 and 13. A user computing device may be any suitable computing device, such as a personal computer, a mobile phone, a tablet, an embedded device, a server computer system, and more. In an embodiment, the user computing device includes a display (e.g., an external monitor connected to a personal computer or a screen of a smartphone) and a human interface device (HID) such as a mouse or a touch screen. The user computing device, in an embodiment, runs an operating system and one or more applications. Computer software such as an application includes executable code usable to render a local canvas and connect the user computing device to a collaborative editing session via a network such as the Internet. In an embodiment, the canvas is displayed in an application (e.g., launched via an executable file) that is connected to a server 104. In an embodiment, the user of a computing device is able to connect to a collaborative editing session by launching a graphical web browser and loading the canvas in the web browser, perhaps using one or more plugins such as JavaScript. In an embodiment, the user of a smartphone is able to download a mobile application ("mobile app"), install the mobile application, and load the local canvas via the mobile application.

In an embodiment, a server 104 is a server computer system is one or more computing systems that include executable code that, as a result of execution by one or more processors, causes the server to coordinate the operation of a collaborative editing session. In an embodiment, the server 104 is a service of a computing resource service provider hosted on one or more physical servers, one or more virtual machines, or a combination thereof. The server 104 may perform various operations in the context of a collaborative editing session, such as authentication and authorization of communications between a client (e.g., user computing devices) and the server and/or between different clients, generating identifiers associated with clients, canvases, sessions, objects, etc., transmitting and receiving patches, and more. In an embodiment, the server computer system includes one or more computing devices such as a rack of servers in a data center. In an embodiment, the server computer system is a service of a computing resource service provider that includes a service frontend that supports a set of web service API requests. In an embodiment, user computing devices 102A, 102B, and 102C are clients of the server 104. In an embodiment, the clients and server are arranged in a hub-and-spoke architecture wherein clients communicate to each other via the server 104—in other words, in an embodiment, a first user computing device sends data to a second user computing device via the server rather than submitting the data directly. However, it should be noted various other architectures are also contemplated within the scope of this disclosure. In an embodiment, the user computing devices are arranged in a peer-to-peer network wherein each user computing device has access to information that indicates network locations for other user computing devices connected to a collaborative editing session, and a user computing device is able to send patches comprising local changes to other user computing devices via said network locations.

FIG. 1 illustrates, in accordance with at least one embodiment, patches 106A and 106B that are transmitted by a user computing device to other user computing devices of a collaborative editing session. In an embodiment, a patch is associated with a particular user computing device of a collaborative editing session and encodes metadata associated with one or more operations applied to a local canvas of that user computing device. For clarity, FIG. 1 illustrates an example in which a first user computing device 102A generates a first patch 106A that is transmitted to the server 104 and then transmitted from the server 104 to other user computing devices 102B and 102C of the collaborative editing session. Likewise, FIG. 1 also illustrates a second user computing device 102B that generates a second patch 106B that is transmitted to the server 104 and then transmitted from the server 104 to other user computing devices 102A and 102C of the collaborative editing session. In an embodiment, local patches are sent from a local canvas to the server 104, and the server 104 distributes the patches to other canvases of the collaborative editing session.

In an embodiment, a user computing device generates a patch comprising an array of data entries, wherein each data entry corresponds to a local command that was applied to the user computing device's local canvas. A data entry may include various information, such as an identifier associated with an object, a change, a timestamp of when the operation was applied locally, a change type, and additional change data indicating various aspects of a change (e.g., updated coordinates for an object that was moved from one region of the canvas to another). In an embodiment, the timestamp is generated based at least in part on the user computing device's local clock. Generally, a patch may include metadata corresponding to one or more changes to a canvas and/or objects of a canvas for distribution to other canvases of a collaborative editing session. For example, if a first user computing device 102A modifies a particular object of the local canvas, a patch may be generated and distributed to other user computing devices 102B and 102C of the collaborative editing session so that those remote canvases are able to properly apply the changes that the first user computing device 102A made to the canvas. A patch may also include data such as the relative and/or absolute value of attributes associated to the particular object such as the object's location (e.g., encoded as an x-coordinate and y-coordinate), size, orientation, fade, color, and more. It should be noted, however, that there may exist cases where two users simultaneously modify an object in a manner that causes a conflict wherein only one (or neither) of the two simultaneous modifications are applied to a remote canvas. Such an example of a set of conflicting changes may be in accordance with embodiments described elsewhere in this disclosure, such as in connection with FIG. 5.

A timestamp is recorded when a user computing device performs a command that modifies the state of the local canvas and/or objects of the local canvas, in accordance with various embodiments. However, it should be noted that in many cases, user computing devices do not have access to an atomic clock or other suitable mechanism for performing fine-grained clock synchronization. Accordingly, in various embodiments, it may be the case that various user computing devices of a collaborative editing session are using clocks that are not perfectly synchronized to an absolute time reference (e.g., an atomic clock).

A patch (e.g., patches 106A and 106B illustrated in FIG. 1) may comprise information that associates the patch to a particular user computing device or local canvas of a collaborative editing session and includes information associated with one or more operations performed by that particular canvas. A patch is transmitted on behalf of a user computing device to other canvases (e.g., remote canvases) so as to propagate changes made by one user computing device to other user computing devices. In an embodiment, a first user, via the first user computing device 102A, performs one or more commands resulting in one or more operations being performed on the local canvas, generates a first patch 106A comprising information usable to determine the one or more operations, and provides the patch 106A to the server 104. Continuing with the example, the server 104 may receive the patch 106A, perform one or more operations such as storing the patch 106A using a data storage service, compacting the patch, distributing the patch to one or more remote canvases, and any combination thereof. In an embodiment, the patch is in accordance with those described elsewhere, such as in connection with FIG. 4.

The server 104, in an embodiment, distributes patches received from one user computing device to other user computing devices. In an embodiment, a broadcast mechanism makes all patches available to all user computing devices (e.g., including the user computing device that transmitted the patch to the server), although in other embodiments, the server may determine that less than all of the user computing devices are to receive some or all patches. For example, the server 104 may receive a patch from a user computing device and transmit the patch to all other user computing devices, making an implicit determination that the user computing device that transmitted the patch has already applied the operations encoded in the patch.

Figure 2:
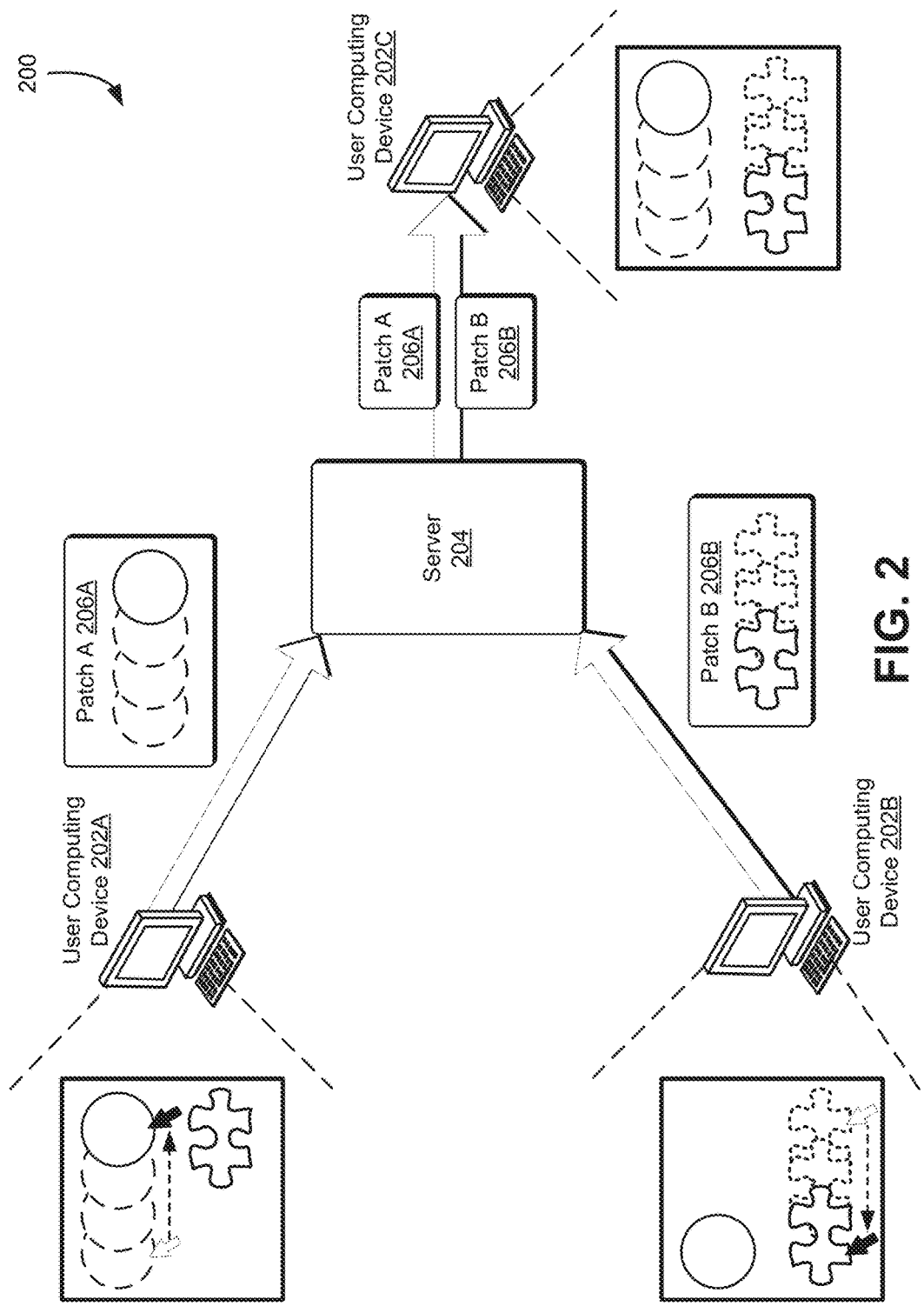
FIG. 2 illustrates an environment that implements various aspects of the present disclosure, in accordance with an embodiment.

FIG. 2 illustrates an environment 200 in which an embodiment may be practiced. The environment 200 illustrates an example of an embodiment in which multiple user computing devices are able to concurrently interact with and contribute changes to a canvas in a collaborative editing session. Furthermore, a user computing device is able to receive and view multiple changes occurring simultaneously in real-time or in near real-time conditions.

FIG. 2 illustrates an environment 200 depicting the flow of patches to a particular user computing device, the third user computing device 202C. A first user, via a first user computing device 202A, may be performing one or more actions encoded in a first patch 206A, and at the same time or substantially the same time, a second user, via a second user computing device 202B, may be performing one or more actions (possibly different actions from the first user) encoded in a second patch 206B, and both patches 206A, 206B may be sent to the third user computing device 202C via the server 204 and processed by the third user computing device 202C in real-time or near real-time conditions. In this context, real-time may refer to a minimal but acceptable amount of delay between the transmitting of a patch to the receiving of the patch by the user computing device. For example, in the context of latency in audio communications, an acceptable delay may refer to a delay of less than 200 milliseconds. In the context of a collaborative editing session, the delay threshold may also be 200 milliseconds, or may be more, or may be less.

As described elsewhere, such as in connection with FIG. 1, a user may refer to an entity controlling a computing device hosting a local canvas or the computing devices themselves. A user may, in an embodiment, be uniquely associated with an identity, although such need not be the case. For example, a particular identity may be logged in at multiple computing devices connected to a collaborative editing session. In such an example, each session opened may be considered a different user and have a different identifier associated with respective local canvases. The user computing devices, server, and patches illustrated in FIG. 2 may be in accordance with those described elsewhere in this disclosure, such as those described in connection with FIGS. 1, 3, and 5.

In an embodiment, a user computing device joins a collaborative editing session (e.g., by creating the session or joining an ongoing session) and creates a local canvas. A user computing device that joins an ongoing session or resumes a session that was previously ended may receive one or more patches and/or snapshots that are usable to update the state of the user computing device's local canvas to the most recent state or, more generally any previously valid canvas state. Accordingly, patches and/or snapshots may be provided to a user computing device to enable the user computing device to construct a valid state of the user computing device's local canvas. A snapshot for time T may comprise a set of patches (e.g. compacted) that, if applied, re-creates the state of the canvas at the time T. The snapshot may comprise a set of patches that can be used to determine the state of the canvas (e.g., including the values for all mutable attributes of all objects of the canvas) at a particular point in time. For example, the snapshot may include a set of patches that include sufficient data to determine the state of a canvas at a time T (e.g., the set of patches may include all patches with a timestamp less than or equal to time T). In an embodiment, the snapshot at a time T includes a set of patches that is usable to determine the state of a canvas at the time T and removal of any patch of the set of patches makes at least some state information of the canvas indeterminable. In an embodiment, a user computing device submits a web service API request to obtain patches and/or snapshots corresponding to a valid canvas state at a particular point in time in the past (e.g., by supplying a timestamp indicating the point in time the canvas should correspond to) or to the current canvas state (e.g., by indicating the system clock time, by indicating a time in the future). In an embodiment, a service provider such as a service provider implemented by the server 204 supports separate web service API requests for obtaining the current canvas (e.g., a GetCurrentCanvas( ) API) and a previous canvas (e.g., a GetPreviousCanvas(utcTimestamp) API).

For example, a collaborative editing session may be created and multiple user computing devices such as the user computing devices 202A, 202B, and 202C connected to the session are able to concurrently make edits to their respective local canvases, receive changes from remote canvases, and determine whether to apply the remote changes (e.g., in the case where multiple users simultaneously edit an object).

In the context of a particular user computing device or canvas associated with a user (e.g., a local canvas), a remote canvas may refer to the canvas of another user computing device. Generally, when a user issues a command to perform an operation on the local canvas, metadata associated with the change is recorded, encoded the metadata as a patch, and the patch is provided (e.g., via the server 204) to remote canvases of other users of a collaborative editing session. In this way, the changes made by the particular user are made available to other users. A remote canvas, in an embodiment, refers to the canvas of another user—for example, for user computing device 202A, the canvas displayed on the user's computing device is the user's local canvas, and changes that the user makes to the canvas are applied to the local canvas and those changes are encoded as patches that are distributed to the remote canvases of other users of the session (e.g., users of user computing devices 202B and 202C). Likewise, from the perspective of user computing device 202C, the changes applied to canvases of user computing devices 202A and 202B are considered remote changes applied to remote canvases, which are received by the user computing device 202C as patches 206A and 206B.

As part of establishing a collaborative editing session, a user computing device may establish a connection with the server 204. In an embodiment, a session is established a communications session between a client computing device (e.g., a computing device controlled by a user) and the server 204. Any suitable connection may be utilized, such as WebSocket, a transmission control program (TCP) session, a transport layer security (TLS) session, and more. Generally, a session may be selected based on various criteria, such as security constraints (e.g., if cryptographically verifiable assurances of confidentiality, authenticity, and integrity are required, a TLS session may be appropriate), bandwidth requirements, and performance constraints, and more.

When a local change is applied to a canvas, a patch is generated, such as in the manner described in connection with FIG. 6, and is transmitted by the user computing device to other user computing devices, perhaps via the server 204. When a server receives a patch it propagates the patch to other user computing devices. It should be noted that in some embodiments, the server 204 replicates a patch, so as to make it available to multiple user computing devices. For example, the patch 206A received by the server may be copied such that a copy of the same underlying patch data is transmitted to the recipient user computing device 202C rather than the original communication.

In various embodiments, user computing devices and/or servers may support compaction. Compaction may refer to a process for reducing the data footprint of patches, thereby allowing for more efficient usage of storage resources, bandwidth resources, and more. In an embodiment, a computing entity obtains a set of patches and identifies a subset of the set of patches that is sufficient to construct the canvas at a particular point in time. For example, when creating a snapshot of a canvas at a time T, patches with intermediate states of an object may be discarded whereas a patch that includes the final state of the object (e.g., the state of the object at time T) is preserved. Compaction may be performed by various computing entities participating in a collaborative editing session. In an embodiment, a user computing device compacts local changes queued for transmission to the server—this may be performed to reduce the amount of data sent by the user computing device over a network (e.g., a mobile device which may have limited bandwidth and/or a data usage quota). The server may perform a compaction process in accordance with various embodiments. In an embodiment, the server performs a compaction process as part of generating a snapshot of a canvas at time T by identifying the minimum set of patches needed to construct the state of the canvas at time T. In an embodiment, the server receives patches from one or more users, aggregates the patches from the multiple users (e.g., aggregating all the patches received over a fixed duration), compacts the aggregated patches, and transmits the result of the compaction. It should be noted that, in accordance with principles set theory, the subset and correspondence set described in this context may be equal.

A server 204 transmits one or more patches so that they are received by other user computing devices of the collaborative editing session. For example, the third user computing device 202C receives the first patch 206A that encodes changes made by the first user computing device 202A and also receives the second patch 206B that encodes changes made by the second user computing device 202B. In an embodiment, a canvas receives a patch that corresponds to a set of remote changes, and parses the patch. Each remote change may include an object identifier, a timestamp, and change data. In an embodiment, the timestamp is an HLC timestamp. Upon parsing a remote change from a patch, the user computing device may use the object identifier of the remote change to obtain, from the local canvas, metadata associated with the local object having the same identifier. The metadata associated with the local object may include a timestamp that indicates the last time that the local object was modified (e.g., either by a change made by the local user or by applying a different remote change). If the timestamp of the remote change indicates that the remote change happened after the timestamp of the last local change to the corresponding local object, then the system applies the remote change by using the change data to apply the remote change—for example, moving an object based on the updated coordinates included in change data of the remote change. However, if the timestamps indicate that the remote change happened before the last local change, then the remote change may be discarded. In an embodiment, such as those based on the example just described, an appropriate conflict resolution protocol includes using a last-write-wins rules. However, other suitable conflict resolution protocols may be utilized and are contemplated in the scope of this disclosure. This routine may be repeated for all remote changes in a patch to process the entire patch. In an embodiment, a patch is processed atomically—that is, all changes of a patch are applied (or attempted to be applied) before changes from another patch are applied (or attempted to be applied). Stated another way, atomicity may refer to assurances that all operations of a first patch will be applied (or attempted to be applied) before the operations of another patch are applied (or attempted to be applied).

Returning to FIG. 2, the third user computing device 202C receives a first patch 206A and a second patch 206B. The first patch 206A includes a remote change that indicates a circle object has moved, and the second patch 206B includes a remote change that indicates a puzzle piece has moved. In an embodiment, these two changes do not generate a conflict at least because the modifications are to different object and/or that the modifications are to different regions of the canvas. In either case, the third user computing device 202C applies the patches 206A and 206B in the order received (or based on a timestamp associated with the respective patches) and renders the changes to the local canvas of the third user computing device 202C based on actions taken by other users on remote canvases, namely, by the first user computing device 202A and the second user computing device 202B.

For example, in one embodiment, a user computing device establishes a collaborative editing session by opening a WebSocket connection with the server 204 and, in response to detecting the connection was established, sends an open document request to get a version of all patches needed to construct the current state of a canvas. This may be performed in the case of resuming a previous session or connecting to an ongoing session. In an embodiment, the patches may be compacted by removing redundant patches or patches that contain irrelevant information for collaborative editing purposes. Upon submitting the request, the system (e.g., the user computing device) lists for messages including patch documents. If a patch document was received before the open document request, perhaps due to abnormal network conditions affecting only the open document request, the system may queue the patch document for later processing. Any local patches generated by the user computing device prior to the open document request may also be queued. Once the open document request is returned, the user computing device then unpacks the operations from the received patches and determines how to apply the patch—for example, some patch operations may be discarded as part of a conflict resolution protocol. Once the state of the local canvas is configured, the user computing device may send a notification to the server and begin processing incoming and outgoing patches as in the normal course of operations during a collaborative editing session.

In an embodiment, a user computing device may experience abnormal network conditions that cause a user computing device to be temporarily disconnected from collaborative editing session. For example, a user computing device that is connected via a mobile device may be momentarily disconnected due to the mobile device entering a region where a wireless data connection is lost (e.g., passing through a tunnel). As a second example, an internet service provider (ISP) may momentarily become disconnected due to a variety of reasons. As a third example, a user computing device may be connected via a home networking device (e.g., a router) that momentarily loses power. Regardless, the user computing device may be able to reconnect to an ongoing collaborative editing session. If the user computing device connected to a collaborative editing session receives a close message via a WebSocket protocol, the user computing device may temporarily cease to send outgoing patches and stop processing incoming patches. When the user computing device is disconnected from the collaborative editing session, the user computing device, in an embodiment, continues to process and apply local commands to the local canvas and stores the local changes in an outgoing queue. The local commands may be applied to the local canvas immediately, and resolved and transmitted to remote canvases once the user computing device reconnects to the collaborative editing session. For example, when the user computing device receives an open message, which indicates that the user computing device has reconnected to the server, the following logic may be applied to reconnect: first, the user computing device requests all patches since the last timestamp that was seen from the server; after receiving a response to that request, the system acknowledges all previously sent (but un-acknowledged) patches based on what was received from the server, so as to avoid re-sending the same patch twice; apply any patches that were received from the server; and resume sending processing of the outgoing queue.

Figure 3:
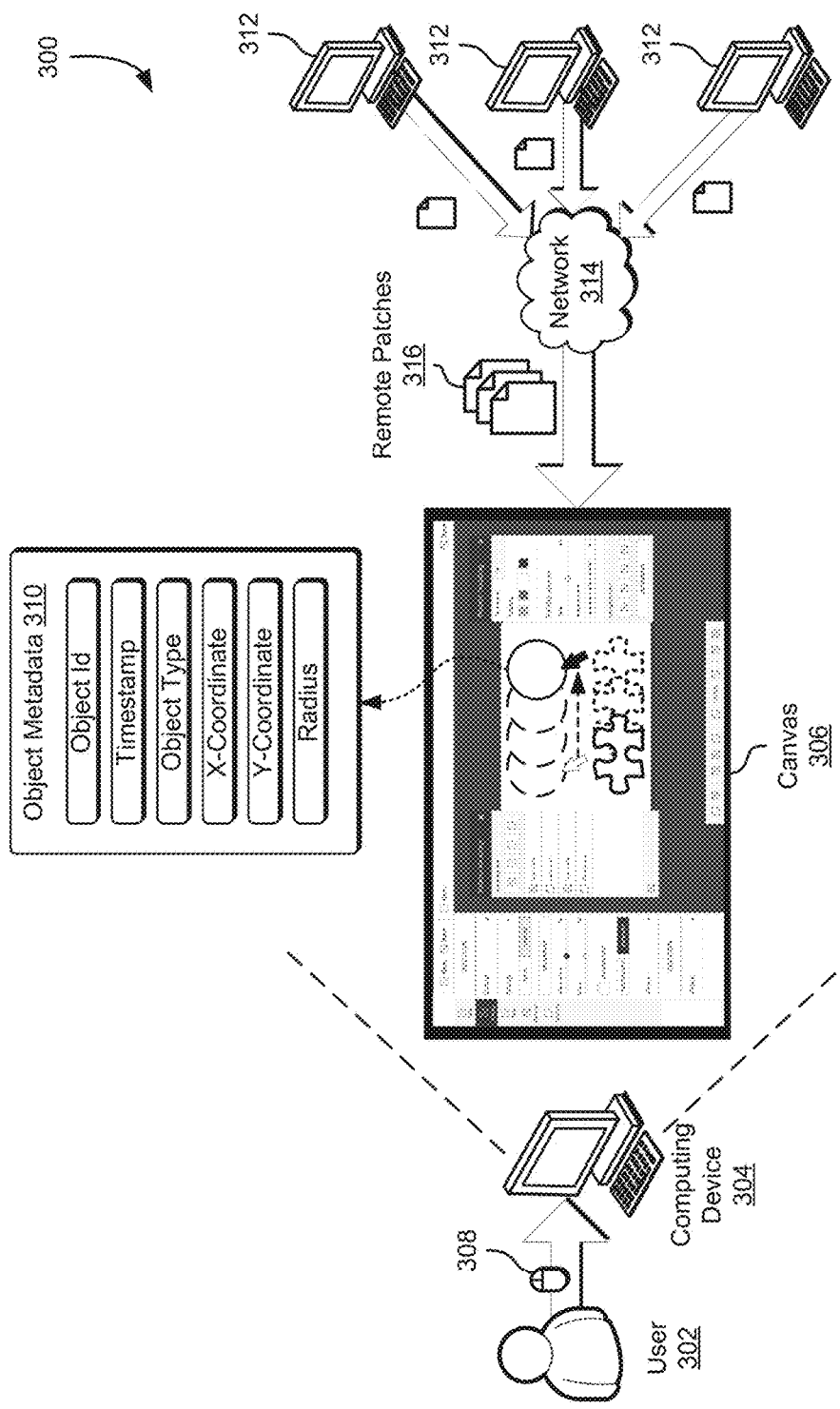
FIG. 3 illustrates an environment in which a user entity uses a client computing device to interact with a local canvas of the user computing device.

FIG. 3 illustrates an environment 300 in which a user entity 302 uses a client computing device 304 to interact with a local canvas 306 of the user computing device. The user may, for example, use a human interface device 308 such as a mouse or other suitable pointing device to interact with the canvas and/or objects of the canvas. The local canvas 306 may be updated based on various changes, such as based on commands issued by the user entity 302 via the computing device 304, based on receiving and applying remote patches 316 received from remote clients 312 of a collaborative editing session, and more.

In an embodiment, the user entity 302 or user is a human or other operator of a computing device 304. The user entity may use a human interface device 308 such as a mouse or other suitable pointing device to interact with the local canvas 306 via a graphical user interface of the computing device. The user may perform commands that move an object, resize an object, change one or more settings associated with an object (e.g., adjust the color of an object, a transparency value), and more. The user may issue one or more commands that are performed on the local canvas, which may update one or more attributes of an object that are stored locally as metadata associated with the object, perhaps in a data structure that resides in short-term memory (e.g., RAM) of the user computing device. For example, as illustrated in FIG. 3, a user 302 of a computing device 304 may use a pointing device to click-and-drag a circle object from the upper-left region of the local canvas to the upper-right region of the local canvas (e.g., using a mouse or other suitable pointing device). As a result of processing the command, one or more attributes associated with the object are updated on the user computing device, such as the x-coordinate of the circle object. Furthermore, metadata associated with the object may be updated with a timestamp that reflects the time at which the object was last modified. In an embodiment, a timestamp is recorded when an object is created and/or deleted from a local canvas. Objects of the canvas may, furthermore, be modified based on data included in remote patches 316 that indicate operations that were applied to remote canvases. Upon receiving a remote patch, the computing device 304 may apply a conflict resolution protocol to determine whether to apply an operation included in the remote patch to the local canvas or the discard the operation.

In an embodiment, the user 302 refers to an entity such as an individual that operates a computing device 304. The user, also referred to as a user entity, may, in an embodiment, be an individual that operates a computing device 304 that includes executable code that, if executed by one or more processors of the computing device, cause the computing device to provide access to a local canvas 306 of the computing device 304, perhaps via a graphical user interface. In an embodiment, the user 302 interacts directly with the computing device 304 hosting the canvas 306 (e.g., using a pointing device physically attached to the computing device 304). However, such need not be the case, and in various embodiments, the user 302 may interact with the computing device 304 in an indirect manner, such as by connecting through an intermediary device—for example, the user 302 may be connected to the computing device 304 using an intermediate device (not illustrated in FIG. 3) via a virtual private network (VPN). As a second example, the user 302 interacts directly with the canvas 306 indirectly, such as through an application or interface that uses libraries and executable code associated with the operation of the canvas 306. For example, in an embodiment, a library such as a dynamically linked library (DLL) includes executable code that, if executed, causes a computer system such as the computing device 304 to instantiate a local canvas. The application or interface described herein may, for example, be a command line interface (CLI) that exposes a set of commands that allow the user to query, create, modify, and delete objects and attributes associated with the objects of the canvas.

The computing device 304 illustrated in FIG. 3 may be in accordance with those described elsewhere in this disclosure. The computing device 304 may, for example, be a personal computer, a mobile phone, a tablet, an embedded device, a server computer system, virtualizations thereof (e.g., a virtual machine instance hosted in a computing environment of a computing resource service provider), and more. The computing device 304 may support various types of human interface devices that allow the user 302 to interact with a canvas. An example of a human interface device 308 is a computer mouse, as illustrated in FIG. 3.

The client computing device 304 may be configured with a client library that includes executable code that, if executed by one or more processors of the computing device, cause the computing device to initialize, load, and display a local canvas 306. The client library may be any suitable software module, such as a static library, a dynamically linked library, an executable file, and more. In an embodiment, the user 302 downloads an installation package to the computing device 304 and installs the package. Upon completion of the installation, the user may launch an executable file that includes executable code that is operable to connect the computing device 304 to a server (e.g., as described in connection with FIGS. 1, 2, and 5) that facilitates communications with other computers via a collaborative editing session. In an embodiment, the user is required to provide authentication and authorization credentials (e.g., a username and password) to utilize various services provided by the server. The client computing device 304 may comprise an internal clock that is not synchronized to the clocks of other computing devices (e.g., the remote computing devices 312). In some cases, the clocks of the client computing device and other computing devices of a collaborative editing session have access to imperfect internal clocks that are not synchronized to a perfectly accurate global clock (e.g., an atomic clock).

The user 302 may interact with the computing device 304 using a human interface device 308. Examples of human interface devices include, but are not limited to, keyboards, computer mice, touchscreens, styluses, video and/or audio capture devices and more. In an embodiment, the user utilizes the human interface device 308 to interface with a local canvas viewable on a display of the computing device and issue commands to the local canvas, such as a click-and-drag command that moves an object from one region of the canvas to another or re-sizing an object of the canvas. These are merely non-exhaustive examples of different commands that a user may issue via the human interface device to modify a local canvas 306.

The canvas 306, in an embodiment, refers to a local canvas of the computing device 304 that reflects the user's view of the state of a canvas in a collaborative editing session. For example, the local canvas may sometimes differ from remote canvases because the user has not yet received a patch from the remote canvas that includes changes that were made to the remote canvas. A remote canvas, in an embodiment, refers to the canvas of another user of a collaborative editing session.

Generally, a canvas 306 may comprise a list of objects and attributes associated with the objects and/or the canvas itself. Some or all attributes are mutable, and some or all attributes may be required attributes, which may depend on context. In an embodiment, each object of the canvas 306 has a corresponding object metadata 310 record. For example, an object corresponding to a circle on the canvas may have several attributes, such as an object identifier, a timestamp, an object type, coordinates, and more. In an embodiment, the timestamp is an HLC timestamp. In an embodiment, each object of the canvas is required to have an object identifier that is unique in the context of the canvas—in other words, no two objects share the same object identifier. Furthermore, some attributes may be required based on context—for example, the coordinate values and radius value may be required for a circle object, but an object corresponding to the background of the canvas may have different required attributes (e.g., a background color, transparency value). In an embodiment, the computing device 304 includes executable code that enables the computing device 304 to render a display of the canvas. The canvas 306 may be rendered, for example, in an application, as a web page of a graphical web browser, and more.

The state of a local canvas 306 (e.g., values of attributes associated with objects of the canvas and/or the canvas itself) may be affected by commands issued by the user 302 to the computing device 304, perhaps using a human interface device 308. The local canvas may also be modified by remote patches 316. A remote patch may refer to a patch (e.g., a patch described in connection with FIG. 4) associated with operations performed by another user to a remote canvas. For example, if another user modifies a particular object in a particular way, it may be the case, assuming no conflicts exist, that the local canvas 306 should reflect those changes as soon as possible so as to provide the user 302 with the most accurate view of the state of the objects in the canvas. As an example, a remote user may make one or more changes to a remote canvas on a remote computing device (e.g., any of the remote computing device 312 illustrated in FIG. 3) of a collaborative editing session, generate a patch based on the one or more changes, and transmit the patch to a server via a network 314. The patches of multiple remote users may be batched and provided to the computing device 304, and the computing device 304 may process the remote patches 316 to update the state of the local canvas 306 in accordance with changes reflected in the remote patches 316. In an embodiment, remote patches are applied according processes described elsewhere, such as processes described in connection with FIG. 7.

Figure 4:
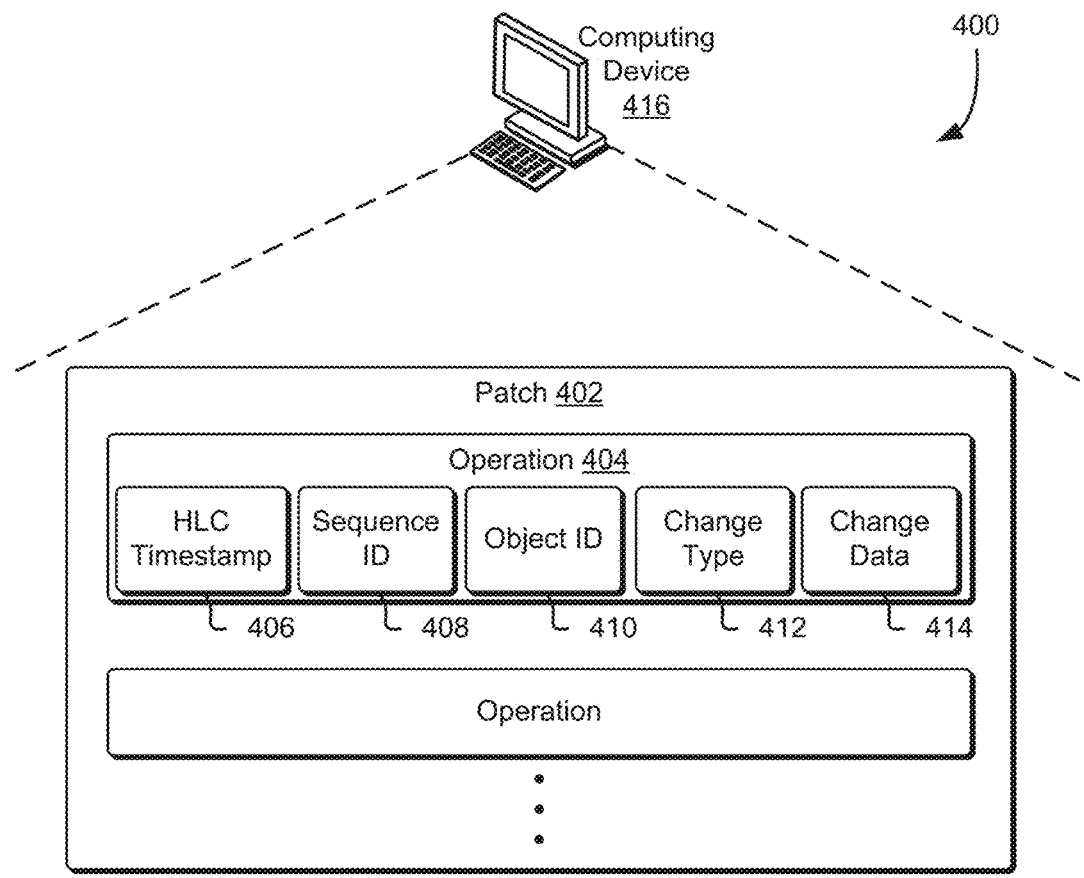
FIG. 4 illustrates a diagram of a patch in accordance with various embodiments.

FIG. 4 illustrates a diagram 400 of a patch 402 in accordance with various embodiments, such as those described in connection with FIGS. 1-3, 5-7, and 13. In an embodiment, a patch comprises one or more operations 404, and each operation includes various attributes, such as the attributes 406-414 illustrated in FIG. 4. It should be noted that the attributes included in various operations may differ. However, in many embodiments, each operation includes an object identifier and a timestamp. The patch 402 may be generated by a computing device 416 such as a personal computer, a mobile phone, a tablet, an embedded device, a server computer system, virtualizations thereof (e.g., a virtual machine instance hosted in a computing environment of a computing resource service provider), and more. The patch 402 may be encoded in various data formats that facilitate transmission of the patch across a network (e.g., from a client computing device to a server and/or other client computing devices), storage of the patch (e.g., in a data storage device such as a hard disk drive), and more.

A patch 402 and/or operations of a patch may be generated by a user of a collaborative editing session in connection with performing a local command or operation. The patch may be transmitted from the local computer system to a server, and then distributed by the server to remote clients of a collaborative editing session, such as in the manner described in connection with FIGS. 1-3 and 6. For example, the patch 402 illustrated in FIG. 4 may be in accordance with patches described in connection with FIG. 3. A patch 402 may include an identifier associated with the particular user and/or canvas that generates the patch.

In an embodiment, a patch 402 is a data structure that includes a list of one or more operations 404. In some cases, however, the patch 402 may include zero operations, such as in the case where a patch is periodically transmitted from a client to a server to serve as a heartbeat to notify the server that the client is still connected to an ongoing collaborative editing session. The patch may include a timestamp indicating when the patch was transmitted. A patch may also be transmitted upon request, such as in a case where a server invokes a routine to take a snapshot of the canvas at a certain point in time, with assurances that all operations that occurred up to that point are reflected in the snapshot and the server submits requests to all connected users requesting that the users provide patches for all of their respective local changes up until the indicated point in time.

When local operations are performed (e.g., in response to a command issued by a user using a human interface device connected to a computing device), metadata associated with the local operation may be recorded and encoded in operation 404. In an embodiment, an operation includes one or more of the following attributes: a timestamp, a sequence identifier, an object identifier, a change type, and/or change data.

In an embodiment, when a local command is processed (e.g., a command issued by a user of a computing device), a timestamp 406 is recorded that corresponds to the time that the command was processed. In an embodiment, the computing device has access to a hybrid logical clock and generates a HLC timestamp according to the hybrid logical clock. An HLC timestamp may be one that is described in accordance with "Logical Physical Clocks and Consistent Snapshots in Globally Distributed Databases" by Kulkarni, et al., which is hereby incorporated by reference. In an embodiment, an HLC timestamp is a 64-bit timestamp that is in accordance with one or more Network Time Protocol (NTP) formats.

An operation 404 may also include a sequence identifier 408. A sequence identifier may refer to information that is usable to determine the order in which to process multiple operations of a patch. For example, the sequence identifiers may be an integer indicating the ranking or ordering in which the operation should be processed by remote canvases. In some cases, a sequence identifier is not included in a patch, and the order in which operations is to be processed by a remote patch is determined implicitly—for example, operations of the patch may be structured serially such that the operations of the patches are processed in the order they are de-serialized.

In some embodiments, each operation 404 includes an object identifier 410 that corresponds to an object of the canvas. The object identifier 410 may be utilized by a remote canvas to identify the object to update in accordance with the operation. In an embodiment, the object identifier 410 is a Globally Unique Identifier (GUID) or a Universally Unique Identifier (UUID). In an embodiment, the object identifier 410 is generated at least in part from information associated with the computing device that creates the object on the canvas, such as a Media Access Control (MAC) address associated with a component of the computing device. This may, for example, be done to insure that if two different devices simultaneously create different objects that they are assigned different object identifiers. The same or substantially similar problem may arise in the more general case where a first user creates a first object and assigns an identifier and a second user creates a second object and assigns the same identifier before it receives a patch from the first user indicating that the identifier has been associated with the first object. Of course, various alternative methods for selecting object identifiers are contemplated, such as reserving non-overlapping ranges of identifier values for each user, thereby eliminating the possibility of identifiers colliding.

A change type 412 may refer to the type of change that was applied by the local command. The change type 412 may be an enumerated data type that encodes a set of valid change types, such as change types corresponding to creation, deletion, and modification of the object corresponding to the object identifier.

Change data 414 may refer to data that is usable to determine how to apply a remote operation to a local canvas of the computing device that receives a patch. As an example, for a change that modifies the location of an object on a canvas, the change data 414 may comprise the new coordinates (e.g., x-coordinate and y-coordinate) of the object as a result of applying the remote operation. In some cases, the operation 404 may lack change data 414, such as when an object is deleted and no change data is needed to process such a remote change.

A patch 402 including a plurality of operations may be generated as a result of a local command that includes a set of intermediate operations that occur to cause the command to be executed. For example, consider the case in which an object is moved from one region of a local canvas to another, such as illustrated in connection with FIG. 1 when the first user of FIG. 1 clicks-and-drags a circle object from the upper-left region of a canvas to the upper-right region of the canvas. In an embodiment, the clicking-and-dragging of the circle object across the canvas results in the generation of multiple operations, each change data corresponding to the location of the object as it is being moved across the canvas. An example patch may include the following operations as a user clicks-and-drags the circle object from the upper-left region of the canvas to the upper-right region of the canvas:

| Timestamp | Object ID | Change Type | ChangeData.X | ChangeData.Y |
|---|---|---|---|---|
| 2018-01-11T21:18:56.0000 | 0xAB123 | Modify | 150 | 750 |
| 2018-01-11T21:18:56.2500 | 0xAB123 | Modify | 225 | 750 |
| 2018-01-11T21:18:56.5000 | 0xAB123 | Modify | 250 | 750 |
| 2018-01-11T21:18:56.7500 | 0xAB123 | Modify | 260 | 750 |

The timestamp above is in accordance with an ISO 8601 time format, although other time formats may be used to express the timestamp, such as an HLC timestamp as described elsewhere. As illustrated in the table above, a user that clicks-and-drags an object across the canvas may result in a patch that includes multiple operations that track the object as it is being moved across the screen. In an embodiment, the operations are recorded at a regularly defined fine-grained interval (e.g., in the case above, the position of the object is tracked every 250 milliseconds). Accordingly, the operations may be replayed in accordance with the timestamp values so that, at a remote canvas, the object appears to move along the x-axis in the same manner as the operation was performed (e.g., at the remote canvas, the object is also moved across the canvas over 750 milliseconds).

Figure 5:
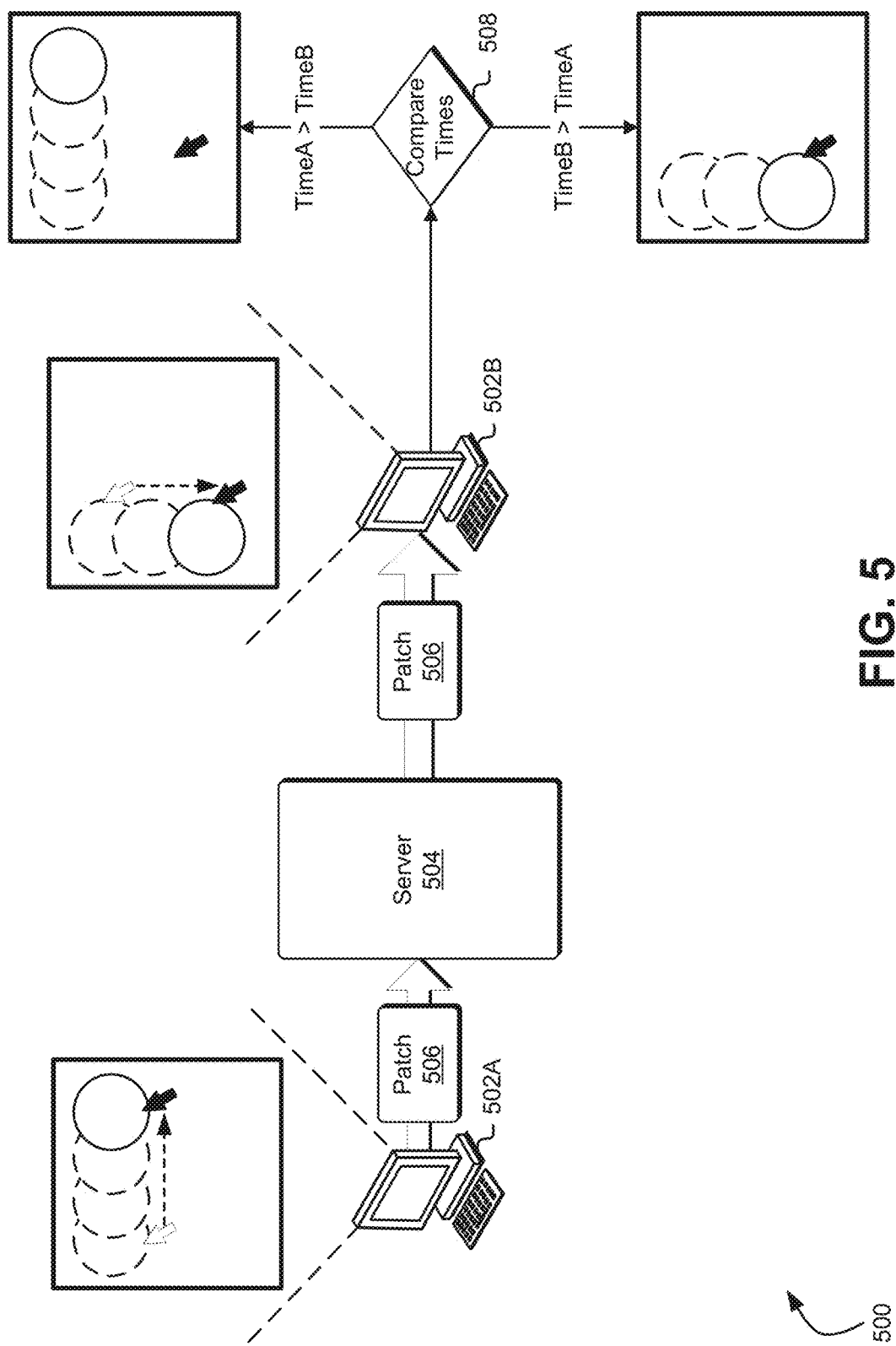
FIG. 5 illustrates an environment in which a user computing device performs a conflict resolution protocol.

FIG. 5 illustrates an environment 500 in which a user computing device receives a set of patches and performs a conflict resolution protocol. FIG. 5, in an embodiment, illustrates user computing devices 502A and 502B of a collaborative editing session.

The user computing devices 502A and 502B may refer to computing devices controlled by respective users of a collaborative editing session. As illustrated in FIG. 5, a first user computing device 502A may modify an object of the first user computing device's local canvas, generate a first patch 506A comprising one or more operations reflecting such a change, and transmit the first patch 506A to the server 504. The first user computing device 502A, as illustrated in FIG. 5, may modify the canvas by moving a circle object from the upper-left region of the canvas to the upper-right region of the canvas. The user computing devices illustrated in FIG. 5 may be implemented in accordance with other embodiments described herein.

The server 504 may be a service of a computing resource service provider comprising one or more computer servers hosting executable code that, if executed by one or more processors, cause the server to coordinate the sharing of state between various canvases in a collaborative editing session. In an embodiment, the server 504 receives the patch 506 from the first user computing device and make the patch available to other user computing devices of the collaborative editing, such as the second user computing device 502B. There may be additional user computing devices participating in the collaborative editing session (not illustrated in FIG. 5). The server 504 may be implemented in accordance with servers described in connection with other embodiments of this disclosure.

The patch 506 may comprise one or more operations and indicate that the first user computing device 502A performed a modification operation on the circle object, wherein the modification includes updating the coordinates of the circle object. The patch may include HLC timestamps corresponding to when the modification occurred, according to a local clock of the first user computing device 502A. The patch illustrated in FIG. 5 may be in accordance with those described elsewhere, such as in connection with FIG. 4.

Simultaneous to the first user's actions, a second user computing device 502B may modify the same object in a manner that generates a conflict. A conflict may refer to two or more operations that are inconsistent. Consider, as illustrated in FIG. 2, an embodiment in which a second user computing device 502B modifies the same circle object prior to receiving the first patch 506A by moving the circle object from the upper-left region to the lower-right region of the second user's local canvas. As a result of the second user modifying the circle object, the local canvas of the second user may have object metadata that is updated to reflect the location of the circle as being in the lower-left region of the canvas as well as a HLC timestamp indicating when the local command to move the circle object was processed. In an embodiment, the second user computing device 502B modifies the local canvas (e.g., by clicking-and-dragging the object from the initial location at the upper-left region of the canvas to the lower-left region of the canvas) prior to receiving the patch 506. However, it should be noted that this does not necessarily imply any temporal relationship between when the circle object was modified by the first user computing device 502A as compared when the circle object was modified by the second user computing device 502B.

In an embodiment, the second user computing device 502B receives the patch 506 and performs a conflict resolution protocol. Generally speaking, modifying the state of a canvas based on a patch may be accomplished using various mechanisms, such as using conflict-free replicated data types (CRDT). An alternative to CRDT is to use Operational Transform (OT). Various criteria may be evaluated in determining the how to mutate canvas state via patches, including consideration as to whether there are few or many expected places where conflicts can occur, and whether mutations can tolerate last-write-wins behavior. In an embodiment, using CRDT is desirable at least because the constraints of a system and/or expected use of the system results in having few places where conflicts can actually occur and an acceptable tolerance of last-writer-wins behavior.

The second user computing device 502B may track changes for each mutable attribute on each object using a hybrid logical clock. Each time a mutable attribute is modified, an HLC timestamp is encoded to the change (e.g., as an attribute of an object or an attribute of an attribute). Accordingly, this allows a user computing device to determine whether an incoming change encoded in a patch predates or postdates the current local version.

As an example, consider the following flow of events:
T1: Device 1 sets object1.fade=50
T2: Device 2 sets object1.fade=75
T3: Device 2 receives a patch of device 1 setting object1.fade=50
wherein T1, T2, and T3 refer to successive times. At T3, Device 2 has already set the fade value for object 1 to 75, and if it were to blindly apply the incoming patch, it would incorrectly set the fade value to 50. This would be incorrect behavior in a last-writer-wins system because that operation predates the local operation. Rather, in an embodiment, the user computing device compare the HLC timestamp of the incoming patch with the local HLC timestamp associated with the object or the attribute. If the system determines that the local timestamp postdates the patch timestamp (or the timestamp of the particular operation of the patch), the remote operation and/or patch is discarded. Otherwise, if the local timestamp predates the patch timestamp, then the patch is applied. It should be noted that in some systems, such as those that employ HLC timestamps each timestamp includes a causality element that enforces at least a partial ordering on events in the system.

Returning to FIG. 5, the second user computing device 502B receives the patch 506, and compares 508 the HLC timestamp associated with the patch (e.g., an HLC timestamp that encodes when the first user computing device 502A moved the circle object) with a local timestamp (e.g., an HLC timestamp that encodes when the second user computing device 502B moved the circle object) and determines whether to apply the remote patch or to discard it. For example, if the patch timestamp postdates the local timestamp, the patch is applied, and the position of the circle object in the second user's canvas is updated to be in the upper-right region. If the patch timestamp predates the local timestamp, the patch may be discarded. It should be noted in some cases, the system may apply the final state of the object, so that there is not a jarring effect of the circle object being at the bottom-left region, and then suddenly being re-positioned to the upper-left region and moved to the upper-right region. In other words, the circle object may be directly refreshed to be positioned in the upper-right region. In some embodiments, a visual indicator will provide information to a user that indicates the object was moved due to an update from a remote actor and superseded a previous local action.

Figure 6:
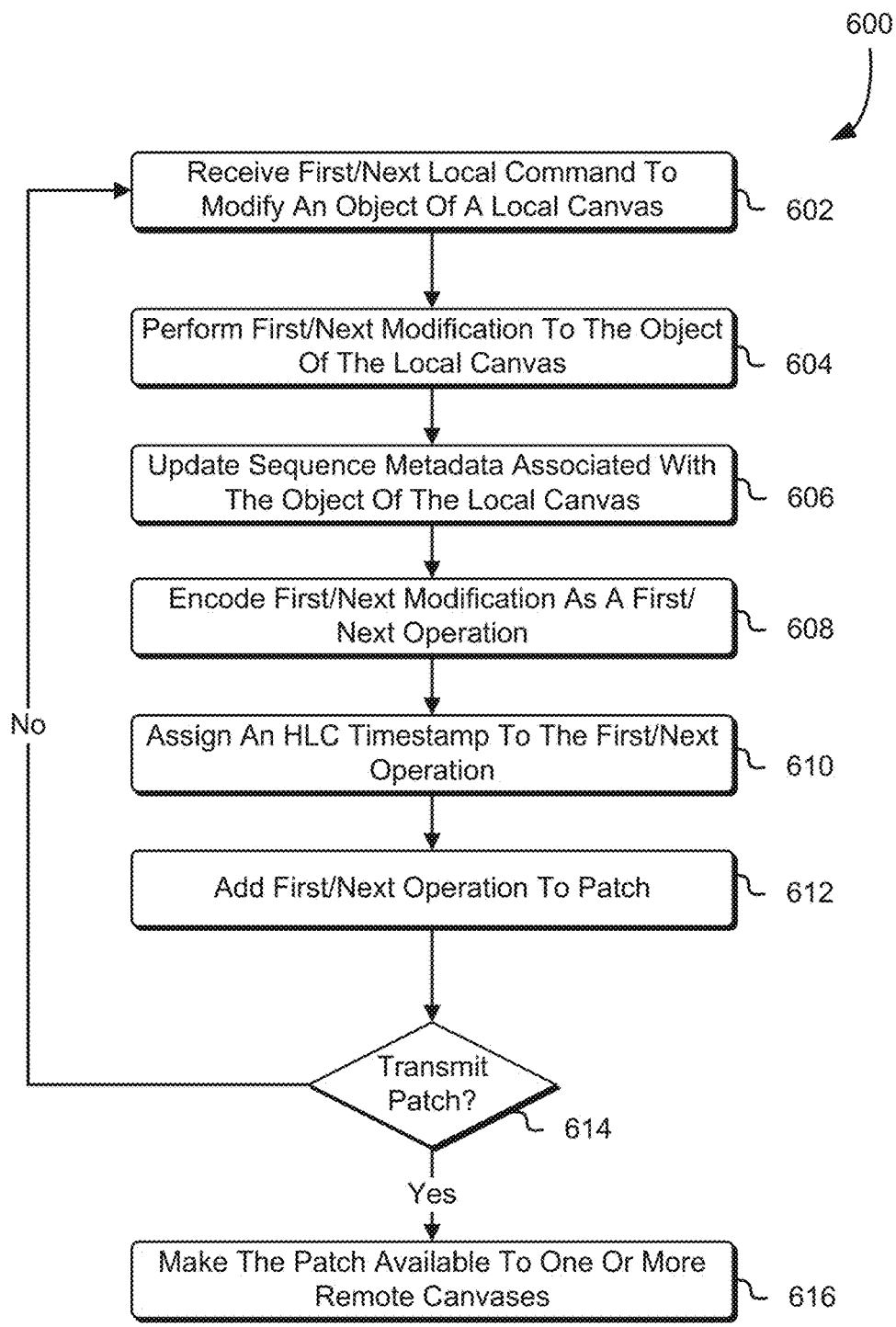
FIG. 6 illustrates a process for processing a local change in a collaborative editing session.

FIG. 6 illustrates a flowchart 600 of a process for processing a local change. The process may be performed by any suitable system, such as a user or user computing device as described throughout this disclosure. In an embodiment, a computing device controlled by the user has a client library that includes executable code that, if executed, causes one or more processors of the computing device to generate a patch. The patch described in connection with the process described in FIG. 6 may be in accordance with those described elsewhere in this disclosure, such as in connection with FIG. 4.

A system, such as a user's computing device, may receive 602 a local command. A local command may refer to a command issued by a user against the local canvas of the computing device, and may be contrasted to remote operations received by the computing device from a server, the remote operations corresponding to actions and/or commands performed by other users on other computing devices of a collaborative editing session. An entity such as a human operator may use a human interface device to submit a local command. The local command indicates that an object of a local canvas should be modified, such as by updating one or more mutable attributes of the object.

Upon receiving the command, the system may perform 604 a modification to the object of the local canvas. The modification may include, for example, modifying one or more mutable attributes associated with the object, rendering or re-rendering a graphical representation of the object in a graphical user interface, and more.

In addition to performing the operation, the system may also update 606 sequence metadata associated with the object of the local canvas. Sequence metadata may be information usable to determine how to resolve conflicts. Sequence metadata may be an HLC timestamp encoded in a NTP compliant format. In an embodiment, the system performs an the modification and updates a timestamp associated with the object and/or attribute indicating when the modification was performed. In an embodiment, the sequence metadata is not a timestamp, but a sequence value that is usable to determine a partial ordering as between the modification and other changes (local or remote) to the object and/or canvas.

In an embodiment, the system encodes 608 the modification as an operation. In this context, an operation may refer to an operation as described in connection with FIG. 4 that includes, for example, an object identifier associated with the modified object, a timestamp of when the change was applied, a change type, and optional change data. The operation may include information usable for a remote client to apply the same modification to a remote canvas. In an embodiment, the system also assigns 610 a timestamp to the operation, which may have the same timestamp as the sequence metadata. In an embodiment, the operation encodes the sequence metadata described above in connection with modification of the object.

The system may add 612 the operation to an existing patch or create a new patch. The patch may be any suitable data structure that is temporarily stored by the system. For example, the operation may be pushed to a stack data structure, and successive operations pushed to the same data structure. Of course, other suitable data structure may be utilized, such as vectors, arrays, maps, lists, queues, trees (e.g., binary trees), and more.

After adding the operation to the patch (e.g., in response to adding the operation to the patch), the system may determine whether 614 to transmit the patch. Various criteria may be utilized to determine whether to transmit the patch. For example, the patch may be transmitted on a periodic basis, such as every 100 milliseconds to facilitate smooth rendering of the aforementioned modifications on a remote canvas. The patch may also have a maximum number of operations that may be sent at once, and once that threshold is reached, the system may determine the patch should be transmitted. In an embodiment, the patch is no more than 100 bytes in size. If the system determines not to transmit the patch, the system may wait for additional commands to be received at the local canvas and steps 602-614 may be repeated in a substantially similar manner as described above.

If the system determines to transmit the patch, the patch may be transmitted to one or more remote canvases. A remote canvas, as described elsewhere, may be the canvas of another user or another user computing device. The patch may be transmitted to a server that distributes the patch to the remote canvases, which may be an appropriate distribution model in a hub-and-spoke network topology. The server may be a server in accordance with those described elsewhere, such as in connection with FIGS. 1-5 and 7. In an embodiment, the patch is transmitted using a WebSocket protocol.

Figure 7:
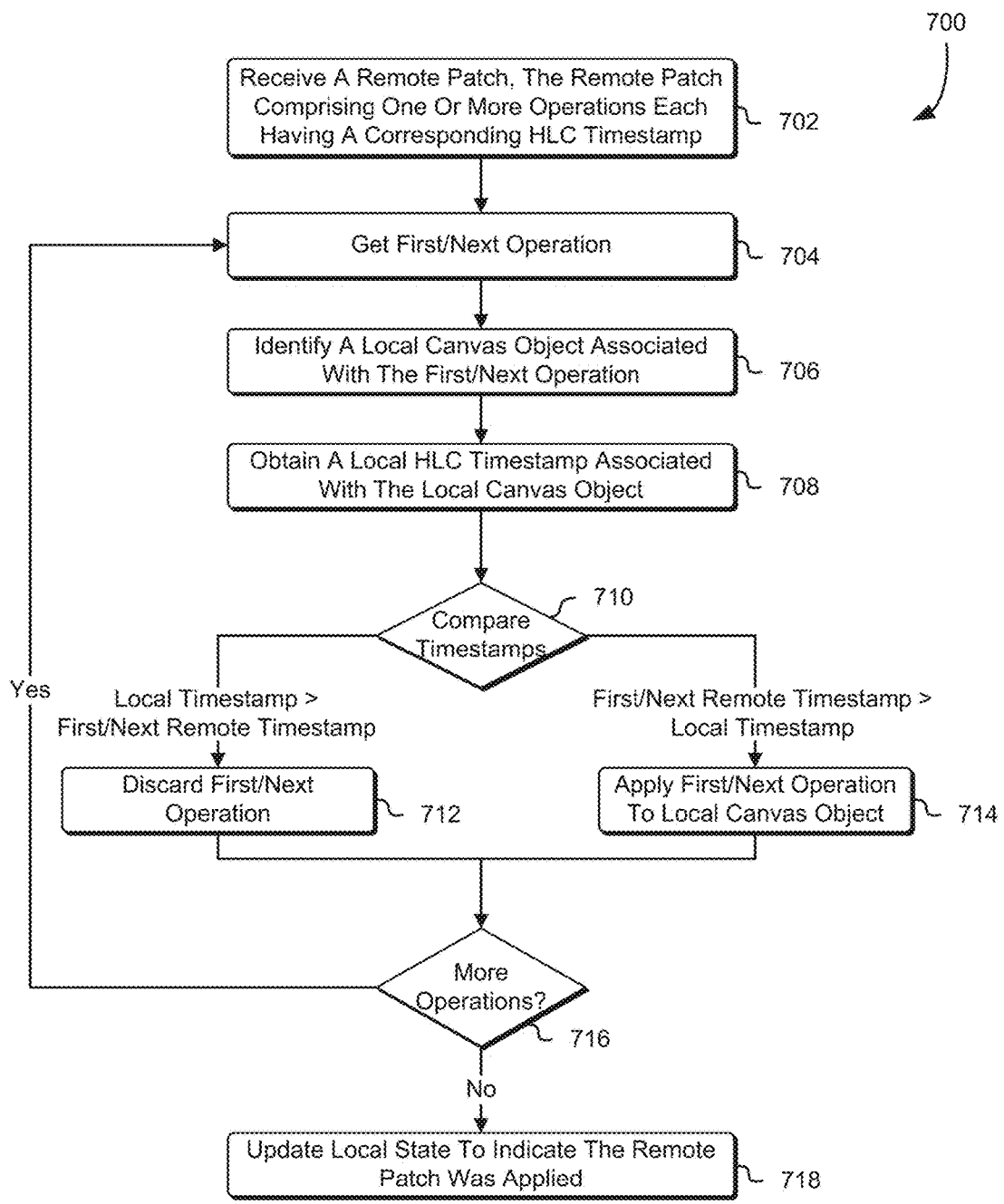
FIG. 7 illustrates a process for processing a remote patch in a collaborative editing session.

FIG. 7 illustrates a flowchart 700 of a process for processing a remote patch. The process may be performed by any suitable system, such as a user or user computing device as described throughout this disclosure. In an embodiment, a computing device controlled by the user has a client library that includes executable code that, if executed, causes one or more processors of the computing device to process the remote patch according to the process illustrated in FIG. 7. The patch described in connection with the process described in FIG. 7 may be in accordance with those described elsewhere in this disclosure, such as in connection with FIG. 4.

The system may receive 702 a remote patch, wherein the remote patch comprises one or more operations each having a corresponding timestamp and/or sequence metadata. In an embodiment, the timestamp is an HLC timestamp usable to determine a partial ordering of operations within the context of multiple user computing devices of a collaborative editing session. In this context, a remote patch may refer to a patch that was generated by another user computing device of a collaborative editing session, transmitted to a server, and routed from the server to the system. The server may be a server in accordance with those described elsewhere, such as in connection with FIGS. 1-6. A remote patch may comprise one or more operations corresponding to actions performed on a remote canvas of another user of a collaborative editing session. In embodiment, any suitable timestamp and/or partial ordering information is usable in lieu of an HLC timestamp.

The system may get 704, obtain, select, identify, or otherwise determine a first operation from the patch. The system may get the first operation in any suitable manner. For example, if the operations are received in a binary data format, the operations may be sequentially de-serialized and processed by the system. In an embodiment, the one or more operations of the patch are stored in a data structure such as an array, vector, linked list, etc. that is amenable to sequential access. In an embodiment, the patch includes a sequence identifier for each operation of the one or more operations, and the first operation is identified as the operation with the lowest (or highest) sequence identifier and so on.

In an embodiment, the operation described in this context is in accordance with those described in connection with FIG. 4. An operation may, for example, include an object identifier. Upon obtaining the operation, the system may read the operation or a portion thereof to obtain an object identifier. The object identifier may be used to uniquely identify an object of a local canvas of the system. In some cases, the system will obtain an object identifier from an operation and query a data structure that stores and/or organizes objects of the local canvas. Such a data structure may be a tree, vector, array, list, queue, and more. A tree may be a binary tree such as a red-black tree.

Upon identifying the appropriate local object from the object identifier of an operation, the system may obtain 708 a timestamp and/or sequence metadata associated with the local object. In some cases, the system obtains an HLC timestamp associated directly with the object or obtains an HLC timestamp associated with a mutable attribute of the object, the mutable attribute being an attribute that was modified at the remote canvas in connection with the selected operation.

In an embodiment, the system compares 710 the values of the timestamp associated with the local object or attribute of the local object and with the timestamp of the operation (also referred to as the remote operation). While the comparison of timestamps is discussed in connection with FIG. 7, it should be noted that the comparison of sequence metadata may also be performed in a suitable manner.

It should further be noted that in some embodiments, such as those described in connection with FIG. 7, that the local timestamp and the remote timestamp cannot have same value. For example, in some embodiments, the local timestamp and remote timestamp include sequence metadata that defines a partial ordering between the local operation associated with the local timestamp and the remote operation associated with the remote timestamp. In such embodiments where timestamps cannot have the same value, the system may, upon determining two timestamps have the same value, throw an error, inform the server of a possible consistency error between canvases, request the patch to be re-transmitted (e.g., in the case of a lossy transmission medium, there may be a non-zero probability that the remote timestamp was inadvertently modified during transmission), and any suitable combination thereof.

If the system determines that the local timestamp postdates the remote timestamp, then the system may, in response, discard 712 the remote operation. In this context, discarding the remote operation may refer to a passive action of not updating the local object and/or mutable attributes of the local attribute with the modifications encoded in the remote operation. This determination to discard the remote operation may be performed in the context of a last-writer-wins conflict resolution protocol.

Otherwise, if the system determines that the local timestamp predates the remote timestamp, then the system may, in response, obtain information relating to the remote operation and apply 714 the operation to the local canvas object and/or mutable attribute. For example, in an embodiment, the operation indicates a change type is an "add" operation that creates a new object having attributes indicated in a change data field of the operation and the system creates a new local object with the indicated object identifier and mutable attributes indicated in the change data field. In an embodiment, the operation indicates a change type is a "modify" operation that modifies one or more mutable attributes of an existing local object of the local canvas to have mutable attribute values indicated in the operation. In an embodiment, the operation indicates a change type is a "delete" operation and the system accesses the local object having the indicated object identifier and performs suitable operations to delete the local object.

The system, after determining how to process a particular operation, may determine whether 716 there are more operations in the patch to process. The determination may be made in any suitable manner, such as determining whether the system has enumerated all elements of a list, all entries of an array, reached the end of a linked list, and more, depending on the type of data structure used to encode the operations of the patch. If more operations are to be processed, the system obtains the next operation and processes it according to steps illustrated in FIG. 7.

Once the system determines no more operations of the patch are pending to be processed, the system may update 718 the local state to indicate that the remote patch was applied. In an embodiment, the system processes a patch atomically, wherein atomicity may refer to assurances that all operations of a first patch will be applied (or attempted to be applied) before the operations of another patch are applied (or attempted to be applied). In an embodiment, updating the local state may include releasing a synchronization object such as a critical section, mutual exclusion object (mutex), semaphore, etc. that was acquired when the system began processing the patch. In an embodiment, the use of a synchronization object is not necessary, such as in embodiments where the system operates processing of local and remote changes in a single-threaded environment or, generally, a computing environment in which processing of operations is not parallelized.

Figure 8:
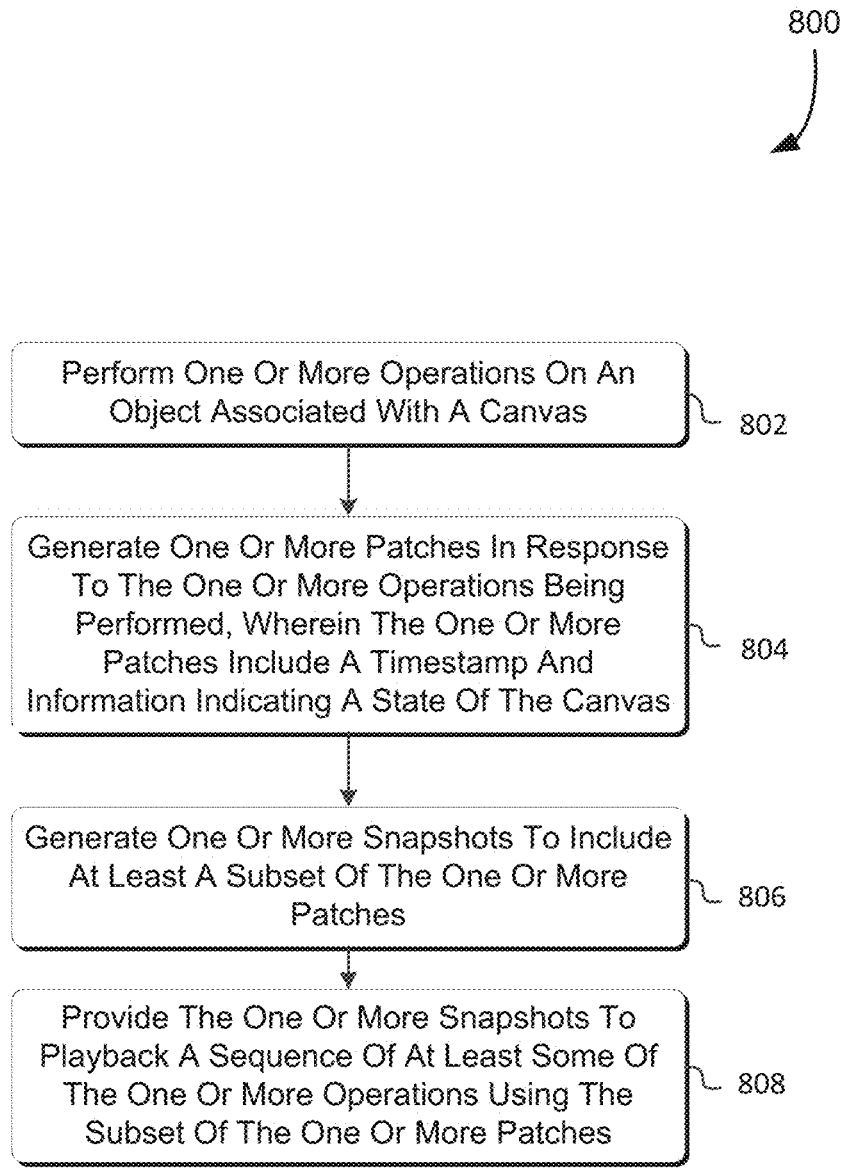
FIG. 8 illustrates a process for generating a snapshot to include one or more patches in response to one or more operations being performed on an object associated with a canvas.

FIG. 8 illustrates a flowchart 800 of a process for generating a snapshot to include patches in response to one or more operations being performed on an object associated with a canvas. The process may be performed by any suitable system, such as a computing device as described throughout this disclosure. In an embodiment, a system controlled by a user has a client library that includes executable code that, if executed, causes one or more processors of the system to generate a snapshot. That is, the system may generate a snapshot for time T that includes a set of patches that is sufficient to represent and/or construct the state of a canvas at the time T. In an embodiment, the snapshot may include a patch and all the contents of a patch as described in connection with FIG. 4.

In 802, a system may be instructed by a user to perform one or more operations on an object of a canvas. An operation, as a non-limiting example, may be an operation that changes an object's shape, orientation, and/or color. Once the system detects that one or more operations have been performed on the object associated with a canvas or, in some instances, on multiple objects associated with the canvas, the system, in 804, may generate one or more snapshots. In an embodiment, the one or more snapshots are generated by including patches (or portions thereof) that have been generated in response to the one or more operations being performed on the object associated with the canvas. For example, a snapshot may be generated to include patches that represent state information when a user instructs the system to change the object's color from red to green. The snapshot may include a set of one or more patches (e.g., a patch that, if applied, updates the object's color attribute to green) and a timestamp associated with when the snapshot was taken. Specifically and for example, in 804, the system may generate the snapshot to include an HLC timestamp to indicate when the snapshot was taken with assurances that all patches that occurred up to that point are reflected in the snapshot. In some embodiments, the system generates the snapshot to include an HLC timestamp and all patches that occurred between a previous snapshot and the time reflected in the HLC timestamp. In an embodiment, the system generates the snapshot using a compacted set of patches, wherein patches that do not include the most recent state of objects of the canvas are discarded—no state information is lost by discarding such patches, as the most recent state information would be included in a more recent patch that is retained. In an embodiment, snapshots are generated not only after patches are generated after an operation is performed but also based on system-defined or user-defined policies. That is, the system-defined policies may specify that snapshots be generated every five minutes to include patches representing states of an object associated with a canvas. As another example, snapshots may be generated only when a user instructs a system to do so.

In 806, the system may store the one or more snapshots in a data storage device. The data storage device may be a device separate from the system that generated the one or more snapshots or it may be the same device. In some embodiments, the generated one or more snapshots may be stored in a hard disk drive, a Universal Serial Bus (USB) drive, a data storage service provided by one or more virtual machines, or any other suitable system for storing data. In an embodiment, the data storage device may have a capacity limit as to the size of each snapshot and size of the total amount of snapshots that may be stored thereupon. In an embodiment, when a data storage device is overloaded, the data storage device may send a request to a server to ask for more data storage resources. In an embodiment, the one or more snapshots may be stored in a data storage device temporarily. That is, a snapshot may be stored for a specific period of time before it is deleted or moved from the data storage device to another data storage device that has the capacity to store snapshots.

In 808, the system may further instruct the data storage device to provide the one or more stored snapshots to another system such that the one or more operations associated with the patches associated with the one or more snapshots may be played back. In other words, a user may direct a system to send a request to the data storage device in order to access the one or more stored snapshots. The user associated with the system may then receive the stored snapshots and via, a graphical user interface, view and playback the sequence of operations that were performed on a specific canvas.

In an embodiment, the request generated by the user from the system may be sent to a central server before being routed to a data storage device to access the one or more snapshots. In an embodiment, the server may determine or decide whether the request may be satisfied based on a set of system-defined policies, user-defined policies, sharing permissions, or a set of conditions. That is, the server may determine, in some instances, whether the sharing permissions allow for the user who sent a request via the system to access the one or more stored snapshots has the permission to do so. The sharing permissions may also indicate whether the user who sent the request via the system may further edit or alter states of the objects associated with the canvas. In an embodiment, when access to the stored snapshots has been deemed acceptable, a system may send the one or more snapshots to the user associated with the system making the request so that the patches representing the sequence of operations that were performed on an object may be played back. Specifically, the sequences of operations that were performed on an object or objects associated with a specific canvas are played back to the user via a graphical user interface of the system.

FIG. 9 illustrates a diagram of generating one or more snapshots every time a patch indicating changes to a state of an object associated with a canvas has been performed. For example, as shown in FIG. 9, a snapshot 910 may be generated to include a patch pertaining to a state 902 of an object (e.g., a circle) in the middle of a canvas. As mentioned previously, the snapshot 910 includes the patch with information about a state of an object but the snapshot 910 may also include information such as an HLC timestamp. The HLC timestamp indicates a time when snapshot 910 was taken. The snapshot 910 may then be stored in a storage device either associated with the system that was instructed to perform the changes to the object or in a different system.

In an embodiment, in order to perform an operation of an object, the system may receive a local command to move the object (e.g., circle.) A local command may refer to a command issued by a user against the canvas of the system. An entity such as a human operator may use a human interface device to submit a local command. The local command indicates that an object of a canvas should be modified, such as by updating one or more mutable attributes of the object (e.g., moving a circle's position relative to and within the boundaries of the canvas).

Upon receiving the command, the system may perform a modification to the object of the canvas. The modification may include, for example, modifying one or more mutable attributes associated with the object, rendering or re-rendering a graphical representation of the object in a canvas displayed in a graphical user interface, and more. A patch may be generated as a result of the object being modified. As an example, the object (e.g., circle) as shown in 904 of FIG. 9, may be moved to the right of the canvas. Once the object (e.g., circle) has been moved to the right of the canvas, the system may generate another snapshot 920 to capture the patch representing the state of the object. Similar to snapshot 910, snapshot 920 may be stored in the same storage device or in a different storage device associated with a different system.

In an embodiment, as shown in 906, the system may be instructed by a user to change the object's (e.g., circle) color. For example, the object (e.g., circle) went from a white colored circle to a black colored circle. The system may then capture another snapshot 930 to capture another patch representing the state of the object (e.g., circle). Again, snapshot 930 may be stored in the same data storage device as snapshots 910 and 920 or in a different storage device associated with a different system. As illustrated and described with respect to FIG. 9, the example consists of one change to the object (e.g., circle) before generating a patch to be stored in association with a snapshot accordingly.

However, there may be alternate embodiments where multiple changes to an object may occur before a snapshot is generated. A snapshot may capture a sequence of patches representing multiple operations that have been performed on the object. For example, the system may receive local commands to change the object's (e.g., circle) position to the bottom right corner of the canvas and further change the object (e.g., circle) from a white color to a black color. Both of these operations may be performed on the object (e.g., circle) before a snapshot is generated. The generated snapshot, in this case, would then include patches about both of the changes to the object (e.g., circle) relative to a specific point in time (e.g., HLC timestamp). In other words, the example of generating a snapshot after one operation being performed on the object associated with a canvas is a non-limiting example and in an alternate embodiment, such as using system defined policies may be applied to control when snapshots are generated in relation to changes being performed on an object.

In an embodiment, a machine learning algorithm could also be implemented such that a system may learn the nuances and tendencies of how a user instructs a system to perform operations to an object of a canvas. That is, for example, the system may learn and adapt to changes where a user only instructs a change to an object every one minute. So, based on machine learning algorithms, the system may then generate system-defined policies where the system generates snapshots no more than one minute apart. By implementing some type of system policy regarding the time and the amount of snapshots taken, it may help the system save storage space and alleviate the storage pressure so that unnecessarily large amounts of redundant snapshots do not have to be stored in a data storage device. In one example, there may be multiple snapshots within a sequence of snapshots that do not include patches with relevant information of changes to a state of an object. For example, system policies dictate that snapshots of an object of a canvas are taken every three minutes, but no changes or alterations to the canvas were made in the last three hours. So, instead of saving 60 snapshots during the three-hour period and storing them to take up unnecessary space, the system may dynamically cause the system to generate snapshots only when a change occurs or when a patch is created. By dynamically changing the time or the process of how snapshots are taken, these results could alleviate redundant snapshots in a sequence of snapshots that are deemed to be irrelevant for playback purposes. In an alternate embodiment, the system may generate all 60 of the snapshots first and after storing them, the system may perform a sweep or a scan of the snapshots by identifying any snapshots without relevant information for playback purposes and delete those snapshots accordingly.

As described above, in an embodiment, each of the generated snapshots 910, 920, and 930 may include the state of an object associated with a canvas and a HLC timestamp of when the snapshot was taken. In an embodiment, the HLC timestamp may be a sequence of metadata associated with the object of the local canvas. Sequence metadata may be information usable to determine how to resolve conflicts. Sequence metadata may be an HLC timestamp encoded in a NTP compliant format. In an embodiment, the system performs a modification and updates a timestamp associated with the object and/or attribute indicating when the modification was performed. In an embodiment, the sequence metadata is not a timestamp, but a sequence value that is usable to determine a partial ordering as between the modification and other changes (local or remote) to the object and/or canvas.

Various alternative implementations and embodiments are also contemplated within the scope of this disclosure. A snapshot may encode and/or be represented by a set of patches (e.g., compacted set of patches) but is not limited to such implementations. For example, a snapshot at time T may be represented by a set of operations that can be used to construct the state of the canvas at the time T. As a second example, a snapshot at time T may be represented by a list of object and object values that correspond to the state of the objects at the time T. In an embodiment, a server receives patches from multiple users of a collaborative editing session and generates patches by transforming the received patches to snapshots, which may encode data in accordance with any of the various embodiments described herein, and may furthermore store the snapshots in any suitable manner.

FIG. 10 illustrates, in accordance with at least one embodiment, a sequence of snapshots with markers. For example and further describing FIG. 9, after snapshots 1002-1008 are generated, the snapshots 1002-1008 may be stored in a data storage device 1000. The storage device 1000 may be a hard disk drive, a Universal Serial Bus (USB) drive, a data storage service provided by one or more virtual machines, or any other suitable system for storing data. As shown in FIG. 10, the data storage device 1000 may include metadata, headers, and/or markers 1020-1028 that are associated with the stored snapshots 1002-1008. That is, for example, over a timeframe of 100 milliseconds, there may have been four snapshots 1002-1008 that were generated for a plurality of patches representing a sequence of operations that were performed on an object associated with a canvas. Each of these snapshots 1002-1008 may include a set of patches that, if applied, recreates the state of a canvas at a specific point in time (e.g., HLC timestamp). Based on the HLC timestamps of each of the snapshots 1002-1008, the snapshots 1002-1008 may be stored in a sequential order from earliest in time that a snapshot 1002 was taken to the most recent snapshot 1008 that was taken. Once the snapshots 1002-1008 are in a sequential order, markers 1020-1028 may be generated to reference a point in time between or in the middle of snapshots 1002-1008. In other words, markers 1020-1028 may be placed or reference a specific position either between or in the middle of a snapshot. The markers 1020-1028 provide a user associated with a computing device an indication as to how a sequence of snapshots 1002-1008 can be divided relative to time. The markers 1020-1028 may also provide a system with relevant information as to a starting point, a middle point, and/or an endpoint in a sequence of snapshots 1002-1008. The markers 1020-1028 may be selected or located by a user via instructions from a computing device to display an object in a state at a specific point in time relative to the changes that were performed on the object.

An as example, the user associated with a computing device may want to locate the state of an object associated with a canvas at a specific point in time after multiple operations were performed on the object by another user on a different computing device. That is, the user associated with the computing device wants to locate a state of an object before it was deleted from the canvas, so that the user associated with the computing device may make other types of operations or changes (e.g., changes to the shape or color) to the object. Accordingly, in an embodiment, the user, via the computing device, sends an instruction to a server in an effort to obtain access to the data storage device that stores the snapshots of the canvas specified in the request. In an embodiment, the server may first determine whether the requesting computing device has the permissions to access the snapshots before sending the request to the data storage device. If the system deems the request to be satisfactory, the system may send a request to the data storage device for snapshots.

The system may determine that the object was deleted after snapshot 1004 was taken and before snapshot 1006 was taken. Since the request from the user associated with the computing device is seeking the object before it was deleted, the system may determine, based on the request, that marker 1024 is when the object changes its state (e.g., from a state of still existing to a state where it has been deleted). Thus, the system may provide snapshots 1002-1004 (e.g., the two snapshots that led up to marker 1024) back to the user associated with the computing device. The user associated with the computing device now may view and/or playback the sequence of operations associated with the patches identified in snapshots 1002-1004 where the object still exists. That is, operations that were performed up to the point before the object was deleted can be played back based on the information included in snapshots 1002-1004. The sequence of operations of snapshots 1002-1004 may be played either in the forward or reverse direction (the reverse direction may be played back if the sequence of operations associated with snapshots 1002-1004 were also stored in the reverse direction) In an embodiment, the user may also direct the computing device to perform additional operations to the object.

Put simply, in an embodiment and as shown in FIG. 10, a marker can be located from a plurality of markers 1020-1028 associated with the one or more stored snapshots. Based on the located marker, one or more snapshots before or after the marker can be identified. Once identified, the one or more snapshots may be provided to a user of a computing device where information included (e.g., the patches representing the sequence of operations that were performed on an object of a canvas) in the snapshots may be replayed.

The speed associated with the playback of the operations performed on the object may be determined by the HLC timestamps of the one or more snapshots and the system or computing device that the snapshots are going to be replayed on. In other words, the HLC timestamps of the one or more snapshots are synchronized with the computing device or system's own local clock. Once synchronized, the speed of the playback can then be controlled either in a faster configuration where all the operations that were performed on the object are sped up or a slower configuration where all the operations that were performed on the object are slowed down until the last snapshot is played. As described above, the snapshots may be played either in the forward or in the reverse direction and the speed may be adjusted accordingly in either direction by synchronizing the HLC timestamps and the local clock of the computing device that the snapshots are played on. In an embodiment, the playback of snapshots in reverse is able to be performed by the originating client (e.g., the client that generated the patch). That is, in order to be able to playback snapshots in reverse order the snapshots are generated with patches that identify operations being performed on the canvas in both the forward and reverse order. Thus, both directions of operations being performed on the canvas are stored as patches in snapshots.

As illustrated in FIG. 11A, a marker 1024 (e.g., at the 50 millisecond mark) can be located and additional snapshots including patches representing additional state changes to an object may be generated or added to a sequence of snapshots. In other words, FIG. 11A illustrates, in accordance with at least one embodiment, a sequence of snapshots and locating a marker to reference a snapshot and further generating snapshots to create a new sequence of snapshots. In an embodiment, the process of FIG. 11A may be deemed as "forking" or "auto-forking." A fork in a sequence of snapshots may occur when a marker 1024 is first located from the plurality of markers and snapshots associated with markers after marker 1024 are deemed to be irrelevant or discarded.

In an embodiment, all the snapshots 1002-1004 leading up to the point of the marker 1024 are identified in sequential order. The snapshots 1002-1004 may include patches with information identifying one or more operations on the object that were performed. A user associated with a computing device may elect to make different changes than the changes that were performed on the object as stored in snapshots 1006-1008. That is, the user associated with a computing device may fork the sequence of snapshots at marker 1024 and perform one or more additional operations on an object or objects associated with the canvas. One or more additional or new patches may be generated and stored in snapshots 1010-1014 in response to the additional operations that were performed on the object(s). The one or more additional or new snapshots 1010-1014 may include some or parts of the same patches representing state changes that were originally in snapshots 1006-1008 or, in the alternative, snapshots 1010-1014 may include patches representing state information that are completely different from snapshots 1006-1008. For example, an object may have changed its position and the position state may have been captured by patches in snapshots 1006-1008; however, the user associated with the computing device wants to do something different with the object after snapshot 1004. That is, the user associated with the computing device wants to change the color of the object instead of making a position change. Thus, the user associated with the computing device may change the color of the object from black, for example, to red and then to green. These changes may then be captured by patches and these patches are stored in snapshots 1010-1014.

In an embodiment, the fork may be automatic (e.g., triggered by system-defined policies). The system-defined policies may have been predetermined by instructions that were previously inputted by a user or an authorized administrator. In an embodiment, machine learning algorithms may also be applied to the system to determine when to fork the sequence of snapshots. For example, the system may learn, based on past operations, that when a user associated with a computing device seeks to make a change on an object associated with a canvas, the system may determine that the user associated with the computing device may be performing operations to first do a dry-run as to how an object will turn out before saving the state of the canvas on its local computing device. Based on the machine learning algorithm, the system may predict that user associated with the computing device does not want to save or send the final changes to a central server or central storage service. Thus, the system may determine that before any states are saved or sent to a server associated with a collaborative editing session for other users on other computing devices to access, a snapshot or a plurality of snapshots in a sequence of snapshots may be forked or split off so that the user associated with the computing device may make local changes to an object and further the system may generate new snapshots with new patches accordingly and store them locally for the user of the computing device to access at a later time.

Figure 11B:
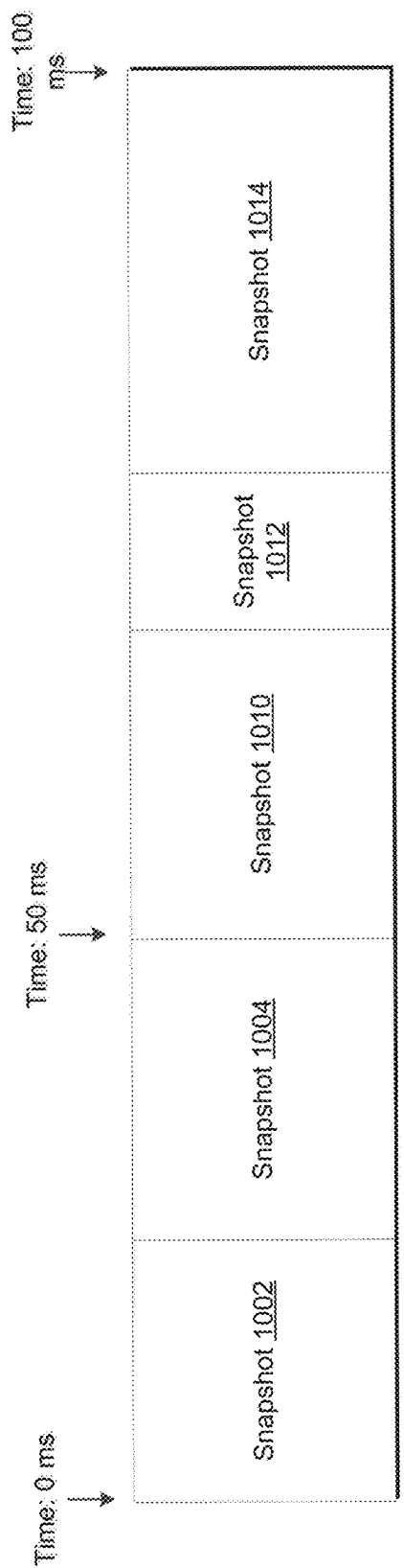
FIG. 11B illustrates a diagram where a new sequence of one or more snapshots are generated.

Further to the description of FIG. 11A, FIG. 11B illustrates a new sequence of snapshots generated by performing additional operations on an object associated with a canvas. For example, the user associated with the computing device may store this sequence of one or more generated snapshots as a new history path that is different from the history path of that was originally in FIG. 11A. That is, the additional operations performed on an object may generate new snapshots with new patches and new HLC timestamps and new states of the object may become a new sequence of snapshots (e.g., 1002-1004 and 1010-1014). These snapshots may be stored separately from the sequence of snapshots of 1002-1008. The new sequence of snapshots (e.g., 1002-1004 and 1010-1014) may be stored in either the same storage device as the snapshots 1002-1008 of FIG. 11A or may be stored in a different storage device.

In an embodiment, the system may cause another fork to occur (e.g., a second fork) at one of the markers associated with the new sequence of snapshots (e.g., 1002-1004 and 1010-1014) of FIG. 11B. If another fork occurs, the system may generate another new sequence of snapshots. This then creates a tree of history paths associated with the object of the same canvas that was originally used to generate the first snapshot in FIG. 11A. A history path may provide a user associated with a computing device with information about all the changes and operations that were performed on the object and the ability to select an object in a state at a specific point in time that may have occurred a long time ago.

Figure 12:
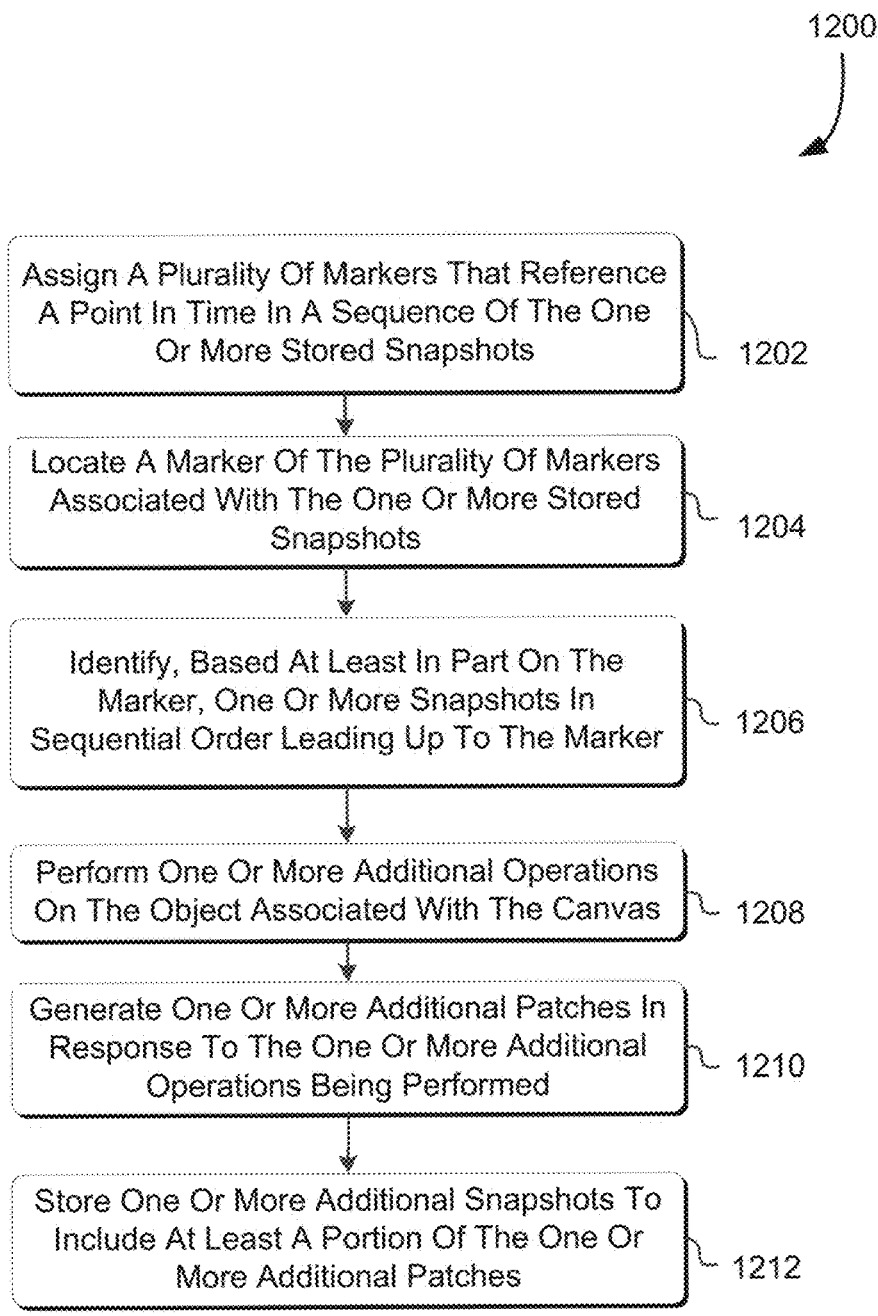
FIG. 12 illustrates a process for generating one or more additional snapshots to include additional patches in response to one or more additional operations being performed on an object associated with a canvas.

FIG. 12 illustrates a flowchart 1200 in connection with FIGS. 11A and 11B. That is, the system may be directed or instructed by a user associated with a computing device to identify a canvas that has an object at a specific point in time. The user associated with the computing device may send a request to a server to identify a canvas with an object at a point in time. The server may determine or decide whether the request may be satisfied based on a set of system policies, sharing permissions, or conditions associated with the system making the request. That is, the server may determine, in some instances, whether the sharing permissions allow for the user who sent a request via the system to access the one or more stored snapshots has the permission to do so. The stored snapshots, in a data storage device, are assigned 1202 with a plurality of markers that reference a point in time in a sequence of the stored snapshots. Once the server determines that the request is satisfactory, the system may use information from the request to locate 1204 a marker of the plurality of markers associated with the one or more stored snapshots.

The system may further identify 1206, based at least in part on the marker, one or more snapshots. In an embodiment, the sequence of snapshots are stored in sequential order based at least in part on the timestamp (e.g., HLC timestamp) of when the snapshots are taken in a data storage device. However, in an alternate embodiment, the snapshots may be stored in a non-sequential order and the data storage device may include metadata or a separate reference table that includes information to locate the snapshots in the storage device or in another storage device.

The system may, after identifying one or more snapshots, perform 1208 one or more additional operations on the object associated with the canvas. After the sequence of operations has been replayed back to the user associated with the computing device and the current state of the object of a canvas is displayed, the user associated with the computing device may cause additional operations or changes to the object of the canvas. Based on these additional changes, the system may then generate 1210 one or more additional patches to be captured by snapshots in response to the one or more additional operations being performed on the object. The additional snapshots may be added to the original sequence of snapshots to generate new sequence of snapshots (e.g., the additional snapshots are added to the last snapshot that the marker was referring to.) In an embodiment, the one or more additional snapshots include new timestamps and information indicating new states of the canvas.

Moreover, the system may store 1212 the one or more additional snapshots. The additional snapshot may be stored in a storage device either associated with the system that performed the changes to the object or in a different storage device associated with a different system.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 13 is an illustrative, simplified block diagram of a computing device 1300 that can be used to practice at least one embodiment of the present disclosure. In various embodiments, the computing device 1300 may be used to implement any of the systems illustrated and described above. For example, the computing device 1300 may be configured for use as a data server, a web server, a portable computing device, a personal computer, or any electronic computing device. As shown in FIG. 13, the computing device 1300 may include one or more processors 1302 that, in embodiments, communicate with and are operatively coupled to a number of peripheral subsystems via a bus subsystem. In some embodiments, these peripheral subsystems include a storage subsystem 1306, comprising a memory subsystem 1308 and a file/disk storage subsystem 1310, one or more user interface input devices 1312, one or more user interface output devices 1314, and a network interface subsystem 1316. Such storage subsystem 1306 may be used for temporary or long-term storage of information.

In some embodiments, the bus subsystem 1304 may provide a mechanism for enabling the various components and subsystems of computing device 1300 to communicate with each other as intended. Although the bus subsystem 1304 is shown schematically as a single bus, alternative embodiments of the bus subsystem utilize multiple buses. The network interface subsystem 1316 may provide an interface to other computing devices and networks. The network interface subsystem 1316 may serve as an interface for receiving data from and transmitting data to other systems from the computing device 1300. In some embodiments, the bus subsystem 1304 is utilized for communicating data such as details, search terms, and so on.

In some embodiments, the user interface input devices 1312 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1300. In some embodiments, the one or more user interface output devices 1314 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device.

In general, use of the term "output device" is intended to include all possible types of devices and mechanisms for outputting information from the computing device 1300. The one or more user interface output devices 1314 can be used, for example, to present user interfaces to facilitate user interaction with applications performing processes described and variations therein, when such interaction may be appropriate.

In some embodiments, the storage subsystem 1306 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1306. These application modules or instructions can be executed by the one or more processors 1302. In various embodiments, the storage subsystem 1306 additionally provides a repository for storing data used in accordance with the present disclosure. In some embodiments, the storage subsystem 1306 comprises a memory subsystem 1308 and a file/disk storage subsystem 1310.

In embodiments, the memory subsystem 1308 includes a number of memories, such as a main random access memory (RAM) 1318 for storage of instructions and data during program execution and/or a read only memory (ROM) 1320, in which fixed instructions can be stored. In some embodiments, the file/disk storage subsystem 1310 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1300 includes at least one local clock 1324. The at least one local clock 1324, in some embodiments, is a counter that represents the number of ticks that have transpired from a particular starting date and, in some embodiments, is located integrally within the computing device 1300. In various embodiments, the at least one local clock 1324 is used to synchronize data transfers in the processors for the computing device 1300 and the subsystems included therein at specific clock pulses and can be used to coordinate synchronous operations between the computing device 1300 and other systems in a data center. In another embodiment, the local clock is a programmable interval timer.

The computing device 1300 could be of any of a variety of types, including a portable computer device, tablet computer, a workstation, or any other device described below. Additionally, the computing device 1300 can include another device that, in some embodiments, can be connected to the computing device 1300 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 1300 for processing. Due to the ever-changing nature of computers and networks, the description of the computing device 1300 depicted in FIG. 13 is intended only as a specific example for purposes of illustrating the preferred embodiment of the device. Many other configurations having more or fewer components than the system depicted in FIG. 13 are also possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising one or more processors and memory storing executable instructions that, if executed by the one or more processors, cause the system to:
    perform a first operation on an object of a canvas according to a command;
    generate a first sequence metadata associated with the first operation, wherein the first sequence metadata is a first Hybrid Logical Clock (HLC) timestamp usable to determine a partial ordering of operations associated with the canvas;
    receive a patch comprising a plurality of operations applied to a remote canvas, the patch associated with a different system;
    identify, from the patch, a second operation associated with the object, a second sequence metadata associated with the second operation, wherein the second sequence metadata is a second Hybrid Logical Clock (HLC) timestamp; and
    cause performance of the second operation on the object based at least in part on the first metadata and the second metadata.

2. The system of claim 1, wherein the instructions comprise instructions that, if executed by the one or more processors, further cause the system to:
    cause performance of the second operation in response to determining the second operation postdates the first operation; and
    determine to discard the second operation in response to determining the second operation predates the first operation.

3. The system of claim 1, further comprising a server computer system comprising a second one or more processors and a second memory storing other executable instructions that, if executed by the second one or more processors, cause the server computer system to:

receive the patch from a second computer system different from the system; and provide the patch to the system.

4. The system of claim 3, wherein the other executable instructions comprise instructions that, if executed by the second one or more processors, causes the server computer system to store at least a portion of the plurality of operations of the patch in a data storage system.

5. The system of claim 4, wherein the instructions to store the at least portion of the plurality of operations, if executed by the second one or more processors, causes the server computer system to store the patch in the data storage system.

6. A computer-implemented method, comprising:
processing a local command to modify an object of a local canvas by performing an operation on the object according to the command;
generating a sequence metadata associated with the operation, wherein the sequence metadata is usable to determine a partial ordering of operations associated with the local canvas and further wherein:
the sequence metadata comprises a physical time value and a causal value; and
generating the sequence metadata comprises incrementing the causal value in response to determining the operation has a same physical time value as a second command performed according to a second local operation; and
causing an update to a remote canvas of a remote computer system, the update being caused based at least in part on the sequence metadata and the operation.

7. The computer-implemented method of claim 6, generating the sequence metadata further comprises resetting the causal value in response to determining the operation has a later physical time value than the second local operation.

8. The computer-implemented method of claim 6, wherein a difference between the sequence metadata and a clock time of when the operation was performed has a predetermined upper bound value.

9. The computer-implemented method of claim 6, further comprising:
encoding the operation and the sequence metadata to a patch; and
transmitting the patch to the remote computer system based at least in part on detecting that a predetermined period has elapsed since a previous patch was transmitted.

10. The computer-implemented method of claim 9, wherein transmitting the patch comprises transmitting the patch over a WebSocket protocol.

11. The computer-implemented method of claim 6, wherein the local command is received via a graphical user interface.

12. A non-transitory computer-readable storage medium having stored thereon executable instructions that, if executed by one or more processors of a computer system, cause the computer system to at least:
process a remote patch comprising a plurality of remote operations and sequence metadata for each remote operation of the plurality by:
selecting a remote operation of the plurality of remote operations, the remote operating having a first sequence metadata, wherein the first sequence metadata is a first Hybrid Logical Clock (HLC) timestamp;
identifying a local object of a local canvas that corresponds to the selected remote operation;
determining a second sequence metadata associated with the local object, wherein the second sequence metadata is a second Hybrid Logical Clock (HLC) timestamp usable to determine a partial ordering of operations associated with the local object; and
causing performance of the remote operation on the local object based at least in part on comparing the first metadata and the second metadata.

13. The non-transitory computer-readable storage medium of claim 12, wherein the remote patch is processed atomically.

14. The non-transitory computer-readable storage medium of claim 12, wherein the operation encodes a conflict-free replicated data type.

15. The non-transitory computer-readable storage medium of claim 12, wherein the remote operation comprises:
the first sequence metadata;
an identifier corresponding to the local object;
a change type; and
change data.

16. The non-transitory computer-readable storage medium of claim 12, wherein the first and second HLC timestamps are in accordance with a Network Time Protocol (NTP) format.

17. The non-transitory computer-readable storage medium of claim 12, wherein the executable instructions include instructions that, if executed by the one or more processors, further cause the system to:
acquire a synchronization object prior to executing the executable instructions to process the remote patch; and
release the synchronization object in connection with completion of the processing of the remote patch.

* * * * *